(12) United States Patent
Sutou et al.

(10) Patent No.: US 7,756,971 B2
(45) Date of Patent: Jul. 13, 2010

(54) METHOD AND SYSTEM FOR MANAGING PROGRAMS IN DATA-PROCESSING SYSTEM

(75) Inventors: Hiromi Sutou, Yokohama (JP); Shuji Fujino, Ayase (JP)

(73) Assignee: Hitachi, Ltd., Tokyo (JP)

( * ) Notice: Subject to any disclaimer, the term of this patent is extended or adjusted under 35 U.S.C. 154(b) by 1239 days.

(21) Appl. No.: 11/257,577

(22) Filed: Oct. 24, 2005

(65) Prior Publication Data

US 2006/0230122 A1 Oct. 12, 2006

(30) Foreign Application Priority Data

Nov. 4, 2004 (JP) ............................ 2004-320832

(51) Int. Cl.
*G06F 15/173* (2006.01)
*G06F 11/00* (2006.01)

(52) U.S. Cl. ......................................... 709/224; 714/4

(58) Field of Classification Search .................. 709/224, 709/226; 714/4, 43; 370/223, 224, 248, 370/253
See application file for complete search history.

(56) References Cited

U.S. PATENT DOCUMENTS

| | | | | |
|---|---|---|---|---|
| 5,995,485 A * | 11/1999 | Croslin | ...................... | 370/216 |
| 6,061,723 A * | 5/2000 | Walker et al. | ................ | 709/224 |
| 6,072,777 A * | 6/2000 | Bencheck et al. | ............ | 370/244 |
| 6,154,849 A * | 11/2000 | Xia | ................ | 714/4 |
| 6,170,010 B1 * | 1/2001 | Hirata et al. | ................ | 709/223 |
| 6,347,074 B1 * | 2/2002 | Croslin et al. | ................ | 370/228 |
| 6,813,634 B1 * | 11/2004 | Ahmed | ........................ | 709/224 |
| 6,904,544 B2 * | 6/2005 | DeRolf et al. | .................. | 714/43 |
| 7,028,228 B1 * | 4/2006 | Lovy et al. | ..................... | 714/57 |
| 7,043,661 B2 * | 5/2006 | Valadarsky et al. | ............. | 714/4 |
| 7,287,192 B1 * | 10/2007 | Engel | ........................... | 714/43 |
| 7,512,841 B2 * | 3/2009 | Walker et al. | .................. | 714/43 |
| 2002/0184554 A1 * | 12/2002 | McKenzie et al. | ............. | 714/4 |
| 2003/0101254 A1 * | 5/2003 | Sato | ........................... | 709/223 |
| 2003/0204597 A1 * | 10/2003 | Arakawa et al. | ............ | 709/226 |

(Continued)

FOREIGN PATENT DOCUMENTS

JP 08-305600 11/1996

*Primary Examiner*—Joseph E Avellino
*Assistant Examiner*—Catherine Thiaw
(74) *Attorney, Agent, or Firm*—Townsend and Townsend and Crew LLP

(57) ABSTRACT

A data-processing system has at least one computer executing at least one application program and at least one storage device. The computer and the at least one storage device storing data are communicatively connected via a plurality of data transfer paths assigned to each program. A data-processing apparatus is communicatively connected to the data-processing system. The data-processing apparatus includes a system configuration storage unit, an abnormality detection information reception unit, an inspection target selection unit and an inspection result storage unit. The system configuration storage unit stores, in a correlated manner, each component of the data-processing system constituting each data transfer path and a program using each component as a data transfer path. The abnormality detection information reception unit receives abnormality detection information indicating that an abnormality is detected while executing an application program, from the computer. The inspection target selection unit selects an inspection target among the each component as a component correlated with the largest number of application programs. The inspection result storage unit stores a result of inspection for a component selected as the inspection target.

17 Claims, 17 Drawing Sheets

U.S. PATENT DOCUMENTS

2004/0078686 A1* 4/2004 Toyooka et al. ............... 714/38
2004/0194061 A1* 9/2004 Fujino ....................... 717/120
2005/0086333 A1* 4/2005 Chefalas et al. ............. 709/223
2005/0144151 A1* 6/2005 Fischman et al. ............ 706/45
2005/0262237 A1* 11/2005 Fulton et al. ................ 709/224
2006/0039291 A1* 2/2006 Sinha et al. ................. 370/248
2006/0087976 A1* 4/2006 Rhodes et al. .............. 370/242
2006/0101308 A1* 5/2006 Agarwal et al. .............. 714/25

* cited by examiner

SYSTEM CONFIGURATION MANAGEMENT TABLE 800

| BUSINESS APPLICATION NAME | OBJECT NAME | LOWER OBJECT | STATUS |
|---|---|---|---|
| BUSINESS APPLICATION A | BUSINESS APPLICATION A | AP SERVER 1 | ALERT |
| | AP SERVER 1 | OS1 | ALERT |
| | OS1 | NETWORK 1 | NORMAL |
| | NETWORK 1 | DB1 | NORMAL |
| | ⋮ | ⋮ | ⋮ |
| BUSINESS APPLICATION B | BUSINESS APPLICATION B | AP SERVER 2 | NORMAL |
| | ⋮ | ⋮ | ⋮ |

FIG.11

OBJECT MANAGEMENT TABLE 810

| No | OBJECT NAME | NUMBER OF SHARING OF OBJECT | VERIFICATION PRIORITY | | |
|---|---|---|---|---|---|
| | | | BUSINESS APPLICATION A | BUSINESS APPLICATION B | BUSINESS APPLICATION C |
| 1 | LOGICAL VOLUME 1 | 2 | 4 | 4 | — |
| 2 | STORAGE DEVICE | 3 | 1 | 1 | 1 |
| 3 | NETWORK 2 | 3 | 2 | 2 | 2 |
| 4 | OS4 | 2 | 5 | 5 | — |
| 5 | OS5 | 1 | — | — | — |
| 6 | DBMS1 | 2 | 6 | 6 | — |
| 7 | DBMS2 | 1 | — | — | — |
| 8 | DB1 | 1 | — | — | — |
| 9 | DB2 | 1 | — | — | — |
| 10 | NETWORK 1 | 3 | 3 | 3 | 3 |
| ⋮ | ⋮ | ⋮ | ⋮ | ⋮ | ⋮ |

FIG.12

SEARCH TREE MANAGEMENT TABLE 820

| OBJECT NAME | LEFT ELEMENT | RIGHT ELEMENT |
|---|---|---|
| STORAGE DEVICE | NETWORK 2 | LOGICAL VOLUME 1 |
| NETWORK 2 | NETWORK 1 | — |
| LOGICAL VOLUME 1 | LOGICAL VOLUME 2 | — |
| ⋮ | ⋮ | ⋮ |

FIG.13

METHOD AND SYSTEM FOR MANAGING PROGRAMS IN DATA-PROCESSING SYSTEM

CROSS-REFERENCE TO RELATED APPLICATIONS

The present application claims priority from Japanese Patent Application No. 2004-320832 filed on Nov. 4, 2004, which is herein incorporated by reference.

BACKGROUND OF THE INVENTION

1. Field of the Invention

The present invention relates to a method and a system for managing programs in a data-processing system.

2. Description of the Related Art

In recent years, since many operations of companies and the like are performed with the use of data-processing systems, high credibility and availability are required for the data-processing systems. On the other hand, if failures or abnormalities occur in the data-processing systems, administrators of the data-processing systems are required to investigate causes and implement countermeasures quickly and accurately, in order to minimize economic losses due to suspension of business and loss of credibility from customers.

Therefore, a variety of technologies are developed for performing diagnostic of failure statuses in the case of failures of the data-processing systems. For example, such a technology is disclosed in Japanese Patent Application Laid-Open Publication No. 08-305600.

However, in the current data-processing systems with large and complicated configurations, it is often difficult to even estimate the point causing failures. For example, in some cases, each component such as an application server, a storage apparatus or network equipment is installed in a geographically remote area. Also, if a manufacturer is different for each component constituting the data-processing system, cooperation may not be obtained from each manufacturer.

In these conditions, one day, an administrator suddenly finds out that a large amount of messages are sent from each component of the data-processing system, which informs abnormality in detail. In this case, the administrator must spend considerable time and effort to identify the point causing the failure.

Therefore, for the case that a failure occurs in the data-processing system, a technology is required for quickly narrowing down the components causing the failure. In a technology performing autonomous control of the data-processing system and enabling autonomous recovery from the occurring failure, it is especially important that the failure occurrence point can be quickly narrowed down.

SUMMARY OF THE INVENTION

The present invention was conceived in consideration of the above problems and its major object is to provide a method and a system for managing programs in a data-processing system.

In order to achieve the above and other objects, according to an aspect of the present invention there is provided a data-processing apparatus communicatively connected to a data-processing system, the data-processing system having at least one computer executing at least one application program and at least one storage device storing data, the at least one computer and the at least one storage device being communicatively connected via a plurality of data transfer paths respectively assigned to the application programs, the data-processing apparatus comprising a system configuration storage unit storing, in a correlated manner, each component of the data-processing system constituting the each data transfer path and an application program using the each component as a data transfer path, an abnormality detection information reception unit receiving abnormality detection information indicating that an abnormality is detected while executing an application program, from the computer, an inspection target selection unit selecting an inspection target among the each component as a component correlated with the largest number of application programs, and an inspection result storage unit storing a result of inspection for a component selected as the inspection target.

The other problems and solutions thereof disclosed by this application will become apparent from the following detailed description of the invention when taken in conjunction with the accompanying drawings.

A method and a system for managing programs in a data-processing system are thus provided which can quickly narrow down a failure point in the data-processing system.

BRIEF DESCRIPTION OF THE DRAWINGS

FIG. 11 is a diagram showing a system configuration management table;

FIG. 12 is a diagram showing an object management table;

FIG. 13 is a diagram showing a search tree management table;

DETAILED DESCRIPTION OF THE INVENTION

Example of Overall Configuration

Figure 1:
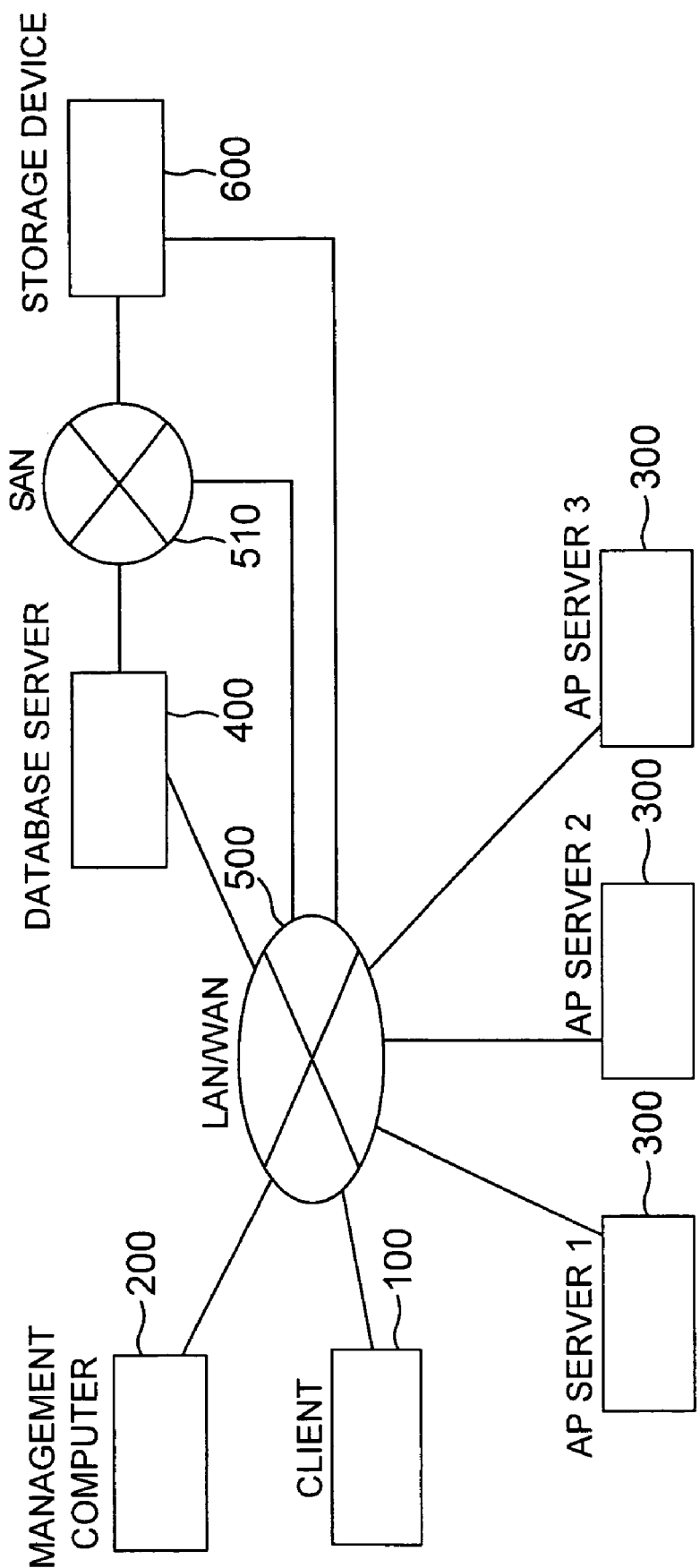
FIG. 1 is a block diagram showing an overall configuration of a computer system according to the embodiment.

FIG. 1 shows an overall configuration of a computer system according to an embodiment.

The computer system according to the embodiment is constituted by communicatively connecting a management computer (corresponding to a data-processing apparatus of the present invention) 200 and a data-processing system via network 500.

The management computer 200 is a computer managing data-processing system.

The data-processing system is configured by including a client 100, application servers (corresponding to a computer of the present invention) 300, a database server 400, a storage device 600, the network 500 and SAN 510 as components. The client 100, the application servers 300 and the database server 400 are communicatively connected via network 500. The database server 400 and the storage device 600 are communicatively connected via the SAN (Storage Area Network) 510.

The client 100 is a computer used by employees of a company and the like when performing a business task. The application servers 300 are computers executing application programs. FIG. 1 illustrates an AP server 1 (300), AP server 2 (300) and AP server 3 (300) as the application servers 300. The database server 400 is a computer for reading and writing data stored in the storage device 600. The storage device 600 is a device for storing data. The database server 400 receives requests from the application server 300 for reading and writing data stored in the storage device 600 and intermediates delivery and receipt of data between the application server 300 and the storage device 600. In this way, the application server 300 and the storage device 600 are communicatively connected. As described later in detail, the application server 300 and the storage device 600 are communicatively connected through a plurality of data transfer paths, each of which is assigned to each application program executed by the application server 300.

If the storage device 600 is provided with a function for enabling connection with the network 500, data can also be given and received between the application server 300 and the storage apparatus 600 without the database server 400. In this case, the data-processing system may be configured without the database server 400 and the SAN 510.

<Application Server>

As described above, the application server 300 is a computer executing application programs. The application programs may be various business programs as represented by a payroll calculation program, a work-hour management program, a sales management program and an inventory management program, for example. As the execution form of the application program, one application program may be executed by one application server 300, or a plurality of application programs may be executed by one application server 300. The data-processing system is configured with at least one application server 300 included therein. The application server 300 executes these application programs depending on various requests transmitted from the client 100. Also, if data must be read from or written into the storage device 600 due to the execution of the application programs, the application server 300 transmits to the database server 400 requests for reading or writing data.

<Client>

The client 100 is a computer used by employees of a company and the like when performing a business task. For example, in order to record work hours, each employee sends clock-in time and clock-out time from the client 100 to the application server 300 executing a work-hour management program. In this case, the application server 300 executing a work-hour management program writes into the storage device 600 the clock-in time and clock-out time and other data for managing the work hours.

<Network>

The network 500 is communication network enabling mutual communication among the application server 300, the client 100, the management computer 200 and the database server 400. The network may be LAN (Local Area Network) in companies, for example. Also, the network may be WAN (Wide Area Network), for example. The network is configured by including communication cables, various network equipments and the like as components.

<Database Server>

As described above, the database server 400 is a computer for reading and writing data stored in the storage device 600. The database server 400 accepts requests from the application server 300 for reading and writing data stored in the storage device 600 and intermediates delivery and receipt of data between the application server 300 and the storage device 600.

<Storage Device>

The storage device 600 is a device for storing data, which receives requests from the database server to read and write data. The data are stored into a memory volume which is one of the components of the storage device 600. The memory volume is a memory area for storing the data, including a physical volume which is a physical memory area provided by such as a hard disk drive and a logical volume which is a memory area logically set on the physical volume. Although, in the embodiment, one storage device 600 is illustrated as shown in FIG. 1, a plurality of storage devices may also be provided.

<SAN>

The SAN 510 is a communication network communicatively connecting the database 400 and the storage device 600. The communication can be performed in the Fibre Channel protocol, for example. The SAN 510 is configured by including communication cables, various network equipments and the like as components.

<Management Computer>

The management computer 200 is a computer managing the data-processing system. The management computer 200 is used by operators such as system administrators managing the information system. To the management computer 200, various pieces of information used for managing the data-processing system are sent from each of components, such as the application server 300, the network 500 and the storage device 600, constituting the data-processing system. The information is, for example, information indicating the operation status of each component, information indicating amounts of data transmitted and received, a CPU (Central Processing Unit) usage rate, the memory capacity of the memory volume, the usage rate of the memory volume and the like. If a failure is detected in each component, a message informing the occurrence of the failure is also sent to the management computer 200.

Equipment Structure

Descriptions will be made for each structure of the management computer 200, the application server 300, the database server 400, the client 100, the network 500, the SAN 510 and the storage device 600.

Figure 2:
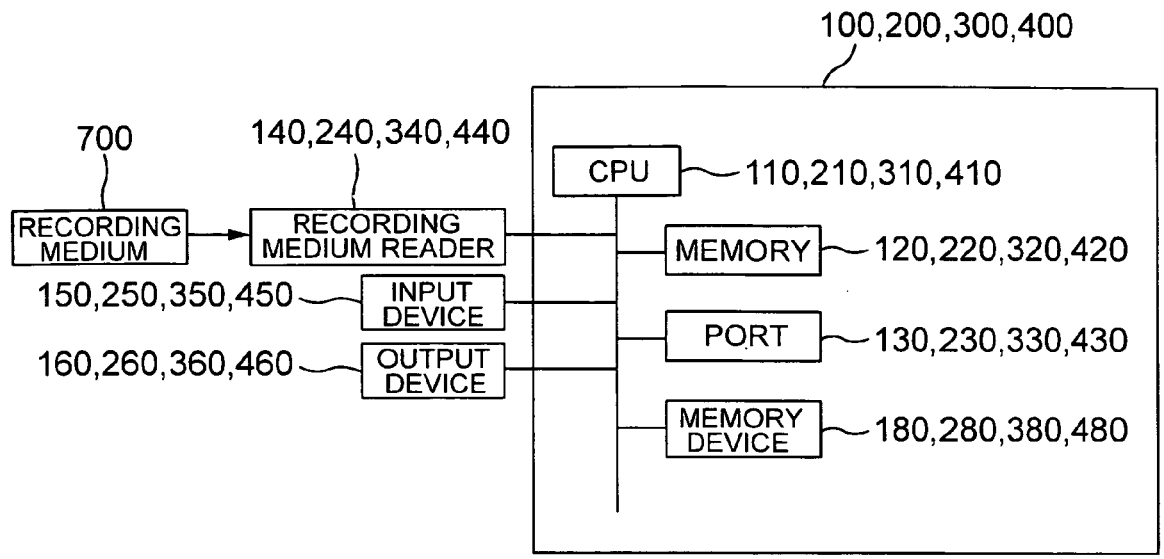
FIG. 2 is a block diagram showing structures of a client, a management computer, an application-server and a database server.

Each of the management computer 200, the application server 300, the database server 400 and client 100 is a computer and has basically the same hardware structure. Therefore, these hardware structures are shown in FIG. 2 as one block diagram. Also, FIG. 3 to FIG. 6 show control programs, tables and the like for realizing each function of the management computer 200, the application server 300, the database server 400 and the client 100, respectively.

Figure 7:
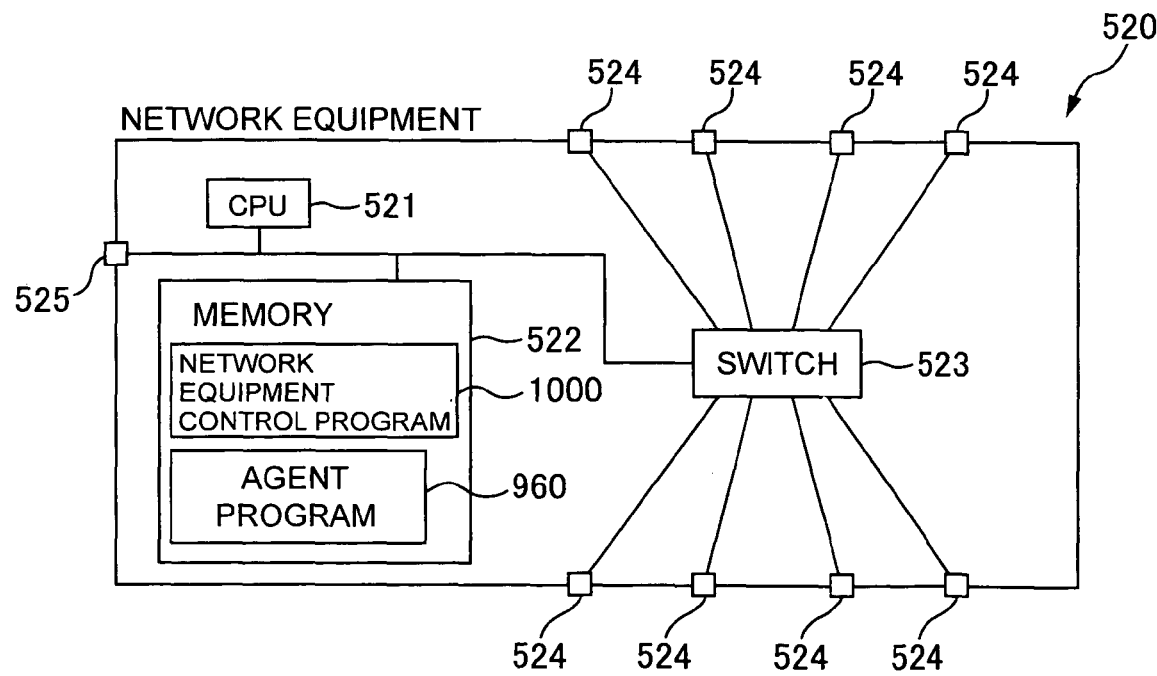
FIG. 7 is a block diagram showing a structure of a network equipment.

For the network 500 and the SAN 510, FIG. 7 shows the structure of the network equipment as represented by hubs and routers. Both the network 500 and the SAN are communication networks and the structure is the same for each of the network equipments. Therefore, FIG. 7 shows the structures of the network equipment constituting the network 500 and the network equipment constituting the SAN 510 as one block diagram.

Figure 8:
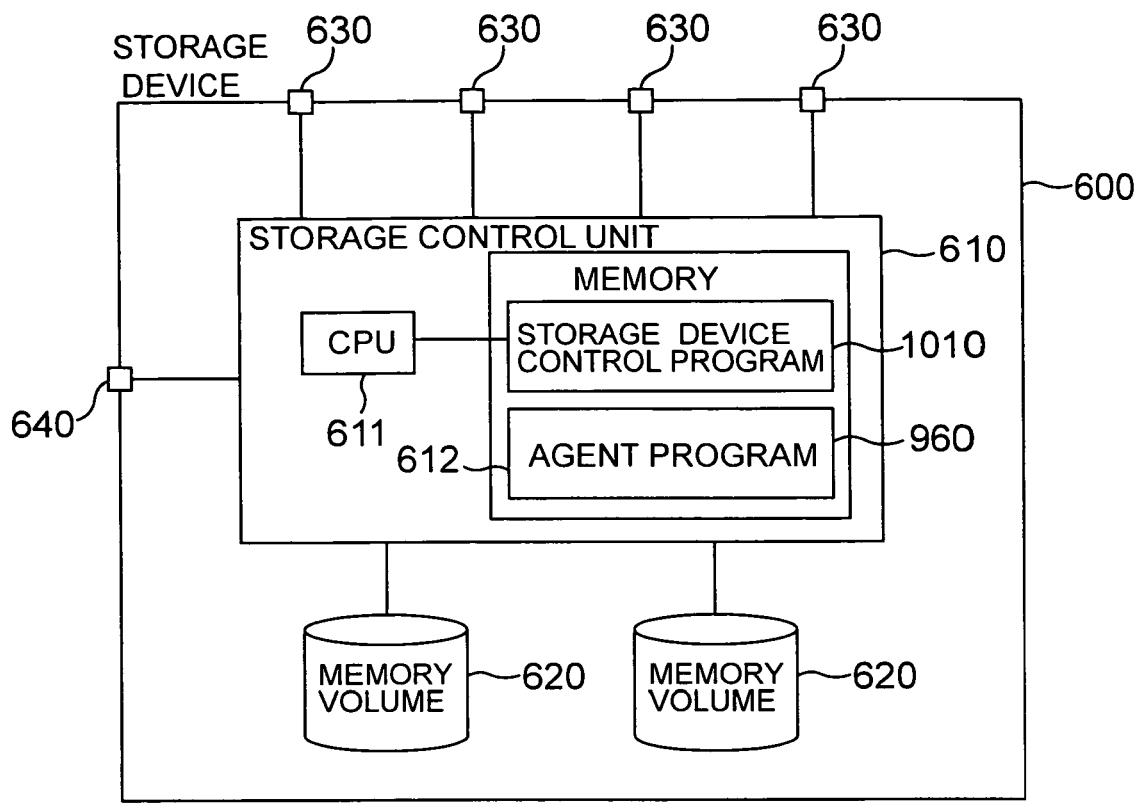
FIG. 8 is a block diagram showing a structure of a storage device.

The structure of the storage device 600 is shown in FIG. 8.

<Structure of Management Computer>

The management computer 200 is comprised of a CPU 210, a memory 220, a port 230, a recording medium reader 240, an input device 250, an output device 260 and a memory device 280.

The CPU 210 is responsible for overall control of the management computer 200 and achieves various functions as the management computer 200 by reading out to the memory 220 and executing an autonomous policy control program 900, a business application control program 910, a business application monitoring control program 920 and a management computer control program 930, which are constituted by codes for performing various operations according to the embodiment, stored in the memory device 280. For example, by executing the business application monitoring control program 920 and the management computer control program 930 and by cooperating with the hardware equipments such as the memory 220, the port 230, the input device 250, the output device 260, the memory device 280, the CPU 210 implements a system configuration memory unit, an abnormality detection information reception unit, an inspection target selection unit, an inspection result memory unit, a selection algorithm input unit, inspection result output unit, an abnormal point identification unit, an abnormal point detail identification unit, an abnormal point output unit and an autonomous policy control unit. The memory 220 can be configured by a semiconductor memory device, for example.

Figure 9:
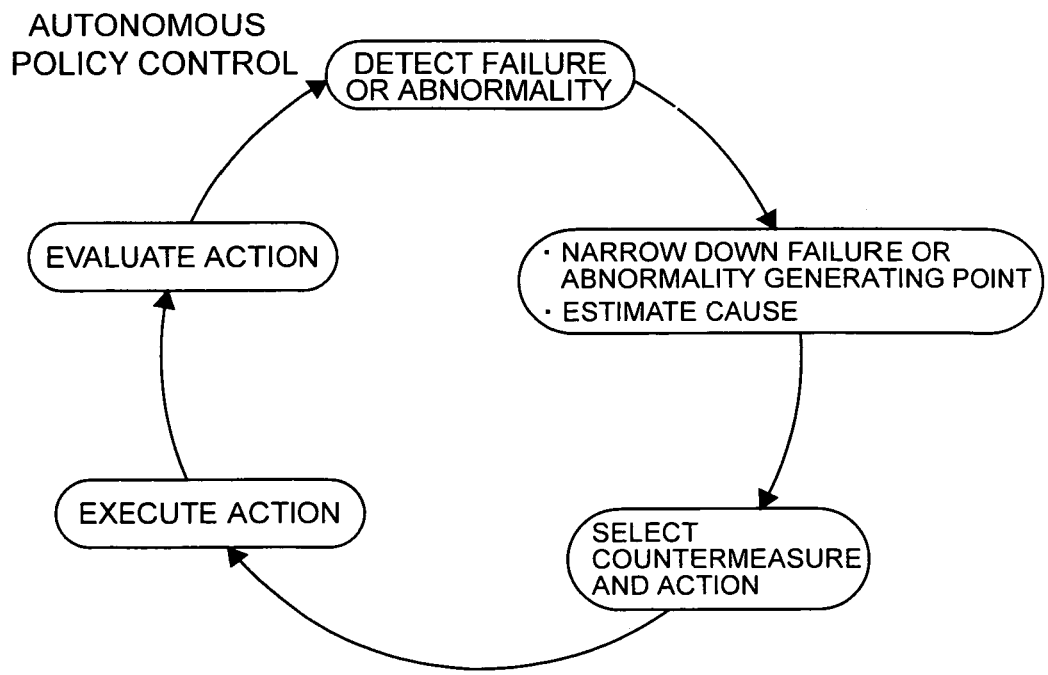
FIG. 9 is a diagram for describing policy control.

The autonomous policy control program 900 is a program for performing autonomous control of the information system. The autonomous control is control for managing the data-processing system without specific instructions from the system administrator. An example of the autonomous control is the control for autonomously responding to a failure and abnormality occurring in the data-processing system. For example, as shown in FIG. 9, if a failure or an abnormality is detected in the data-processing system, narrowing down of the failure and abnormality occurring point and estimation of the cause are autonomously performed and, based on the results, appropriate countermeasures are selected, performed and evaluated for the results thereof. Autonomously performing the series of procedures repairs the generated failure autonomously, reduces burden of management for the system administrator, quickly investigates the cause of the failure and achieves early recovery from the failure. The autonomous control is achieved by executing the autonomous policy control program 900 in mutual collaboration with the business application control program 910, the business application monitoring control program 920 and the management computer control program 930.

The business application control program 910 controls initiation and termination of executing application programs by the application server 300.

The business application monitoring control program 920 monitors whether a failure occurs or not as the application programs are executed based on various information sent to the management computer 200 from each components of the information system and, if occurrence of a failure is detected, narrows down the site where the failure occurs. Details are described later.

The management computer control program 930 is a program for controlling the management computer 200, such as an operating system, for example. In this way, various hardware equipments and software provided on the management computer 200 are controlled.

The recording medium reader 240 is a device for reading out programs and data recorded on a recording medium 700. The read program and data are stored in the memory 200 or the memory device 280. Therefore, the autonomous policy control program 900, the business application control program 910, the business application monitoring control program 920 and the management computer control program 930 recorded on the recording medium 700 can be read out from the recording medium 700 and stored into the memory 200 or the memory device 280.

A flexible disk, magnetic tape, compact disk and the like can be used as the recording medium 700. The recording medium reader 240 may be in the form which is built into or external to the management computer 200.

Figure 3:
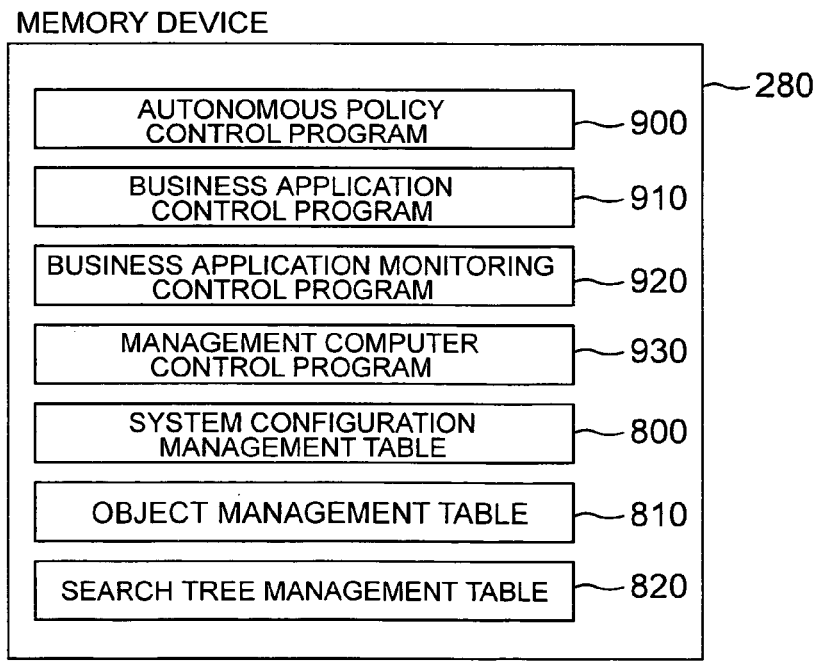
FIG. 3 is a diagram showing a memory device of the management computer.

The memory device 280 can be a hard disk device or a semiconductor memory device, for example. The memory device 280 stores the autonomous policy control program 900, the business application control program 910, the business application monitoring control program 920, the management computer control program 930, a system configuration management table 800, an object management table 810, a search tree management table 820. FIG. 3 shows how these are stored. The system configuration management table 800 is shown in FIG. 11, which is described later in detail. The object management table 810 is shown in FIG. 12. The search tree management table 820 is shown in FIG. 13.

The input device 250 is a device used for inputting data to the management computer 200 and acts as a user interface. As the input device 250, for example, a keyboard, a mouse and the like can be used.

The output device 260 is a device for externally outputting information and acts as a user interface. As the output device 260, for example, a display, a printer and the like can be used.

A port 230 is a device for performing communication. For example, for the communications with other computers, such as the application server 300, the database server 400 and the client 100, which are performed via the network 500, these communications can be performed through the port 230. Also, for example, the autonomous policy control program 900, the business application control program 910, the business application monitoring control program 920 and the management computer control program 930 can be received through the port 230 from other computers via the network 500 and can be stored into the memory 220 or the memory device 280.

<Structure of Application Server>

Then, the structure of the application server 300 is described. The application server 300 is comprised of a CPU 310, a memory 320, a port 330, a recording medium reader 340, an input device 350, an output device 360 and a memory device 380. Functions of these devices are the same as the devices provided on the management computer 200 described above.

Figure 4:
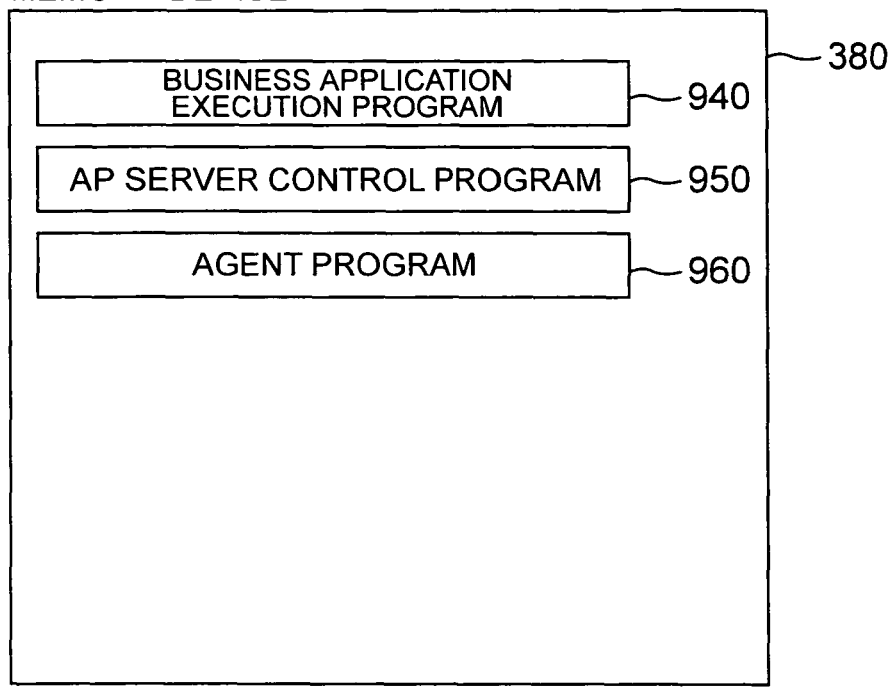
FIG. 4 is a diagram showing a memory device of the application server.

As shown in FIG. 4, the memory device 380 provided on the application server 300 stores a business application execution program (application program) 940, an AP server control program 950 and an agent program 960. By executing the business application execution program 940, the AP server control program 950 and the agent program 960, the CPU 310 achieves various functions as the application server 300.

The business application execution program 940 is a program for performing information processing when employees and others conduct various business tasks. The execution of the business application execution program 940 is initiated by the instruction from the management computer 200 executing the business application control program 910. The business tasks performed by employees are also referred to as business applications.

The AP server control program 950 is a program for controlling the application server 300, such as an operating system, for example. In this way, various hardware equipments and software provided on the application server 300 are controlled.

The agent program 960 is a program which collects various pieces of information for monitoring the application server 300 and which transmits the information to the management computer 200. For example, information is collected and transmitted to the management computer 200, regarding the operation status of the application server 300, the CPU usage rate, the memory usage, the memory capacity of the memory device 380, the status of occurrence of a failure and abnormality and the like.

<Structure of Database Server>

Then, the structure of the database server 400 is described. The database server 400 is comprised of a CPU 410, a memory 420, a port 430, a recording medium reader 440, an input device 450, an output device 460 and a memory device 480. Functions of these devices are the same as the devices provided on the management computer 200 described above.

Figure 5:
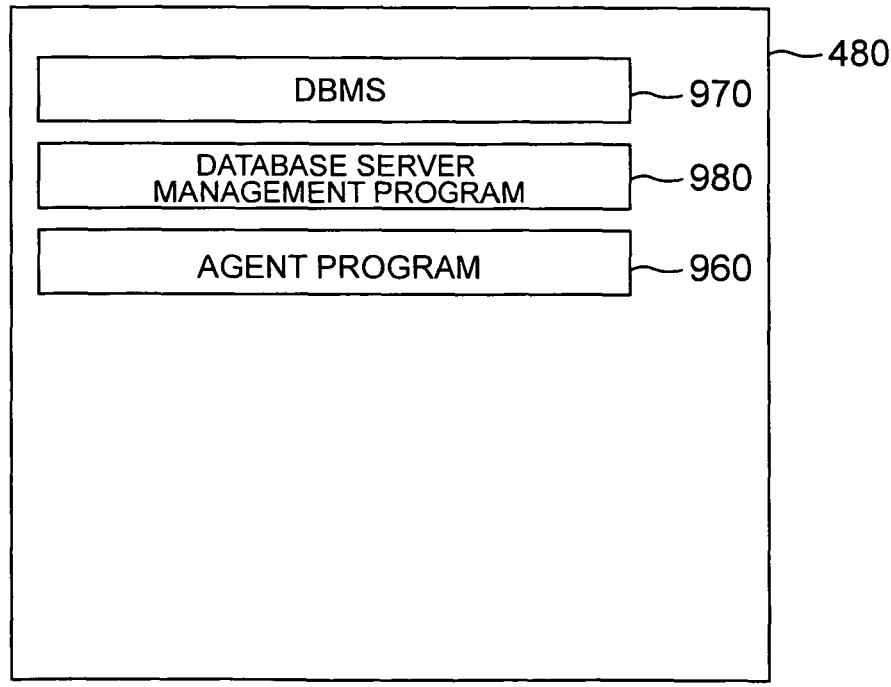
FIG. 5 is a diagram showing a memory device of the database server.

As shown in FIG. 5, the memory device 480 provided on the database server 400 stores a DBMS (DataBase Management System) 970, a database server management program 980 and an agent program 960. By executing the DBMS 970, the database server management program 980 and the agent program 960, the CPU 410 achieves various functions as the database server 400. Hereinafter, the database server 400 is also referred to as DB 400.

The DBMS 970 is a program for reading and writing data stored in the storage device 600, depending on reading and writing requests for the data stored in the storage device 600.

The database server control program 980 is a program for controlling the database server 400, such as an operating system, for example. In this way, various hardware equipments and software provided on the database server 400 are controlled.

The agent program 960 is a program which collects various pieces of information for monitoring the database server 400 and which transmits the information to the management computer 200. For example, information is collected and transmitted to the management computer 200, regarding the operation status of the application server 300, the CPU usage rate, the memory usage, the memory capacity of the memory device 480, the status of occurrence of a failure and abnormality and the like.

<Structure of Client>

Then, the structure of the client 100 is described. The client 100 is comprised of a CPU 110, a memory 120, a port 130, a recording medium reader 140, an input device 150, an output device 160 and a memory device 180. Functions of these devices are the same as the devices provided on the management computer 200 described above.

Figure 6:
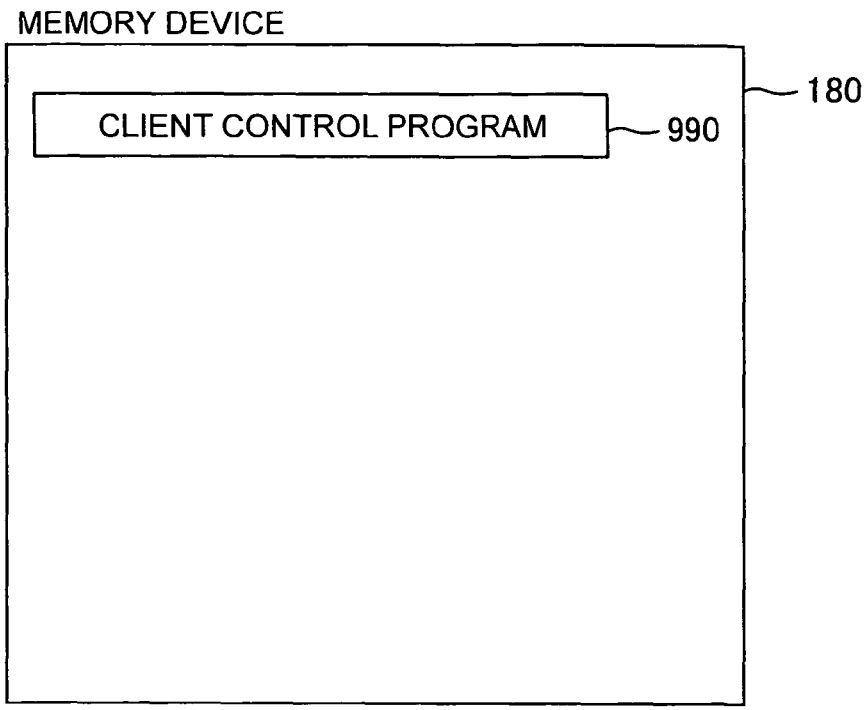
FIG. 6 is a diagram showing a memory device of the client.

As shown in FIG. 6, the memory device 180 provided on the client 100 stores a client control program 990. By executing the client control program 990, the CPU 110 achieves various functions as the client 100.

The client control program 990 is a program for inputting/outputting or transmitting/receiving various data for the employees performing business tasks with the use of the application server 300. The client control program 990 may include a function for performing controls as an operating system.

<Structure of Network, Structure of SAN>

Then, the structures of the network and the SAN 510 are described. The network and the SAN 510 are configured by connecting various network equipments 520 such as hubs and routers via communication cables. FIG. 7 shows a block diagram illustrating the structure of the network equipment 520.

The network equipment 520 is configured with a CPU 521, a memory 522, a switch 523, data ports 524 and management port 525.

The CPU 521 is responsible for overall control of the network equipment 520 and achieves various functions as the network equipment 520 by executing a network equipment control program 1000 and an agent program 960, which are constituted by codes for performing various operations according to the embodiment, stored in the memory 522.

The data ports 524 are connected to other network equipments 520, the application server 300, the management computer 200, the database server 400 and the storage 600 via communication cables.

The switch 523 interconnects the data ports 524. The switch 523 is configured by a cross-path switch, for example.

The network equipment control program 1000 controls, for example, the switch 523 to switch lines between the data ports 524. In this way, a data transfer path can be controlled depending on destinations and origins of data delivered and received via the network 500 and the SAN 510. Also, the network equipment control program 1000 can detect and correct errors in the data delivered and received via the network 500 and the SAN 510.

The agent program 960 is a program which collects various pieces of information for monitoring the network equipment 520 and which transmits the information to the management computer 200. For example, information is collected and transmitted to the management computer 200, regarding the operation status of the network equipment 520, the CPU usage rate, the memory usage, the status of occurrence of a failure and abnormality and the like.

The management port 525 is a communication port for communicating with the management computer 200. The management port 525 is connected with other network equipments 520 and the management computer 200 via communication cables. For example, the various pieces of information collected by the agent program 960 described above are transmitted to the management computer 200 through the management port 525.

<Storage Device>

Then, the structure of the storage device is described in accordance with a block diagram shown in FIG. 8. The storage device 600 is configured with a storage control unit 610, a memory volume 620, data ports 630 and a management port 640.

The storage control unit 610 performs overall control of the storage device 600. For example, in accordance with data write requests and read requests sent from the database server 400, the storage control unit 610 writes data onto predefined addresses of the memory volume 620 and reads data from predefined addresses. Also, the storage control unit 610 sends and receives the read/write data to/from the database server 400. Those functions as the storage control unit 610 are achieved by a CPU 611 provided on the storage control unit 610 executing a storage device control program 1010 stored in a memory 612.

By the CPU 611 executing an agent program 960, various pieces of information for monitoring the storage device 600 are collected and transmitted to the management computer 200. For example, information is collected and transmitted to the management computer 200, regarding to the operation status of the storage device 600, the CPU usage rate, the memory usage, the memory capacity of the memory volume, the usage rate of the memory volume, the status of occurrence of a failure and abnormality and the like.

An identical program may be executed as each of the agent programs 960 executed for each of the above components of the data-processing system, i.e., the application server 300, the database server 400, the network equipment 520 and the storage device 600, or the agent program 960 may be the dedicated program for each component. Of course, some components may have a common program.

The memory volume 620 is a memory area for storing the data, including a physical volume which is a physical memory area provided by such as a hard disk drive and a logical volume which is a memory area logically set on the physical volume. The memory volume 620 can be correlated with the business application execution program 940 executed by the application server 300. If this correlation is made, the data associated with the execution of that business application execution program 940 is stored in that memory volume 620. This correlation with the memory volume 620 can be made not only to the business application execution program 940, but also to the application server 300, the client 100 and the employee, for example.

The data ports 630 are connected with the network equipments 520 via communication cables. In this way, the storage device is communicatively connected with the database server 400 via the SAN 510. As described above, the storage device 600 can be communicatively connected with the network 500. In this case, the data ports 630 are connected with the network equipments 520 constituting the network 500 via communication cables.

The management port 640 is a communication port for communicating with the management computer 200. The management port 640 is connected with the network equipment 520 constituting the network 500 and the management computer 200 via communication cables. For example, the various pieces of information collected by the agent program 960 described above are transmitted to the management computer 200 through the management port 640.

Components for Executing Business Application

Business applications (operations) are performed with the use of the above described data-processing system. When the business application is performed, as shown in FIG. 10, each component of the data-processing system corresponding to the application program for executing each business application is used as a data transfer path between the application server 300 and the storage device 600.

Figure 10:
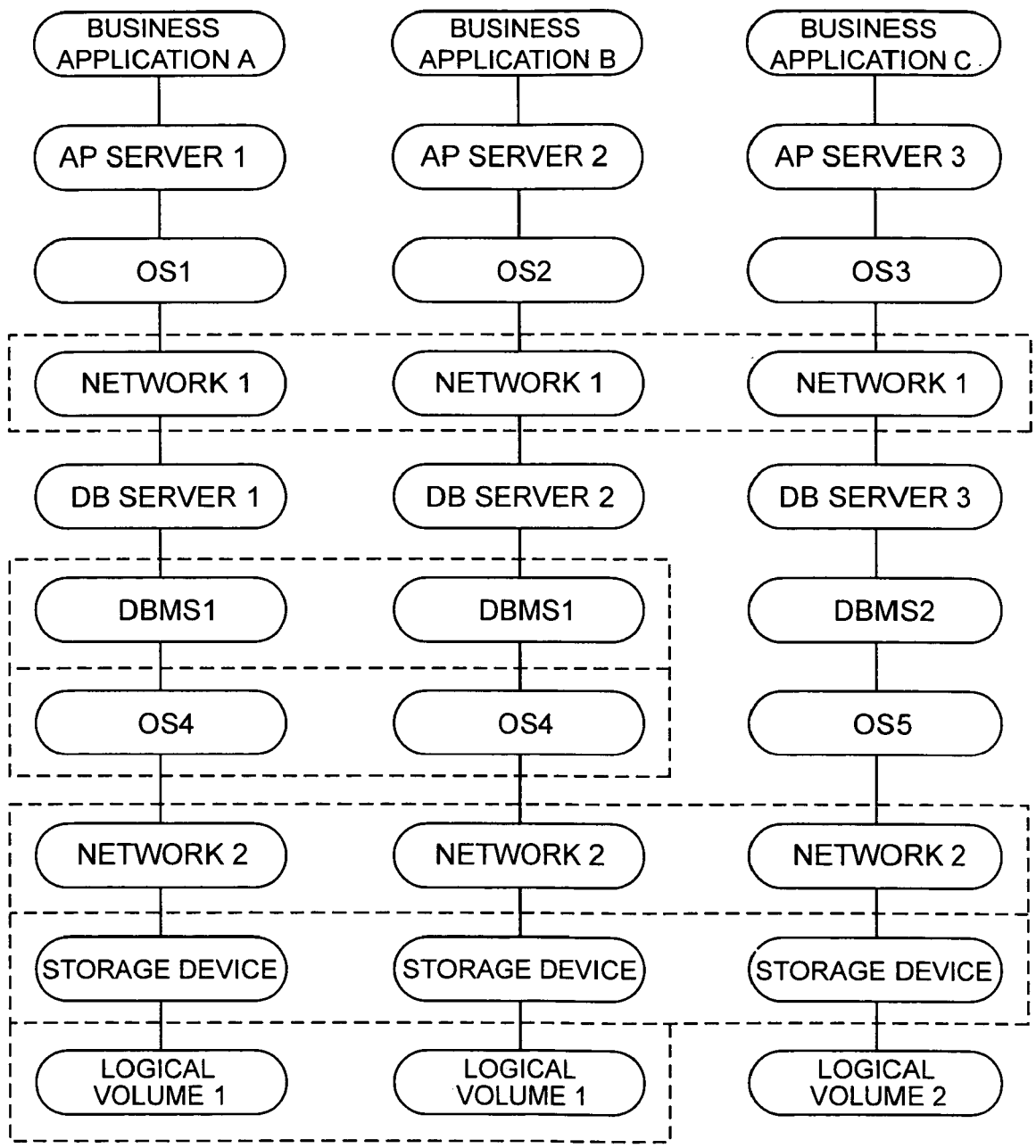
FIG. 10 is a diagram showing a system configuration.

For example, in an example shown in FIG. 10, a business application A is executed in the AP server 1 (300). If data are written into the storage device 600 in accordance with the execution of the business application A, then under the control of the OS (Operating System) 1 (950) executed by the AP server 1 (300), first, the data are sent to the DB (database) server 1 (400) via the network 1 (500). Subsequently, under the control of the DBMS 1 (970) and the OS 4 (980) executed by the DB server 1 (400), the data are sent to the storage device 600 via the network 2 (SAN) (510). Then, the data are written into the predefined logical volume 1 provided on the storage device 600.

If data are read from the storage device 600 in accordance with the execution of the business application A, the data are read from the logical volume 1 and sent to the AP server 1 (300) via each of the above components.

The same applies to the business application B and the business application C. In this way, in the data-processing system according to the embodiment, the application server 300 and the storage device 600 are communicatively connected with each of a plurality of data transfer paths assigned to each of the application programs. Each data transfer path consists of each component in the data-processing system.

The system configuration management table 800 shown in FIG. 11 stores, in a correlated manner, each component of the data-processing system constituting each data transfer path and the application program using each component as the data transfer path.

In the system configuration management table 800 shown in FIG. 11, each component (hereinafter, also referred to as an object) constituting the data transfer path is recorded for each business application. For each object, a lower object is correspondingly stored. In this way, the data transfer path is identified. The lower object is an object aligned closer to the storage device 600 side than the object. The higher object is an object aligned closer to the application server 300 side than the object.

In FIG. 11, "status" fields list information indicating an operation status of each object. The information indicating an operation status of each object is sent to the management computer 200 by executing the agent program in each object. The status can be "failure", "alert", "normal", "temporal failure" and others, for example. The "failure" is, for example, a status indicating that the function of the object is halted. The "alert" is, for example, a status indicating that the function of the object is decreased (for example, predetermined performance is decreased to a specified value or less). The "temporal failure" is, for example, a status indicating that the function of the object was halted in the past. The "normal" is, for example, a status indicating that the operation status of the object is not "failure", "alert" or "temporal failure".

As shown in FIG. 10 by the objects surrounded with dashed lines, the components (objects) constituting the data-processing system have some objects shared by a plurality of business applications as the data transfer path. For example, the network 1 (500) is shared by the business application A, the business application B and the business application C. Other objects are used only by one business application. In this way, each object is used as the data transfer path by the different number of the business applications. Therefore, for each object, the number of the business applications using the object as the data transfer path is recorded in the object management table 810 shown in FIG. 12. "Object sharing number" fields list the number of the business applications using the object as the data transfer path. "Verification priority" fields list an order of inspection when each component of the data-processing system is inspected in order to narrow down a point causing abnormality if the management computer 200 receives abnormality detection information from the application server 300 indicating that the abnormality is detected at the time of execution of application programs. It is noted that the object management table 810 is updated every time the business application is launched.

Narrowing Down of Failure Point

Figure 16:
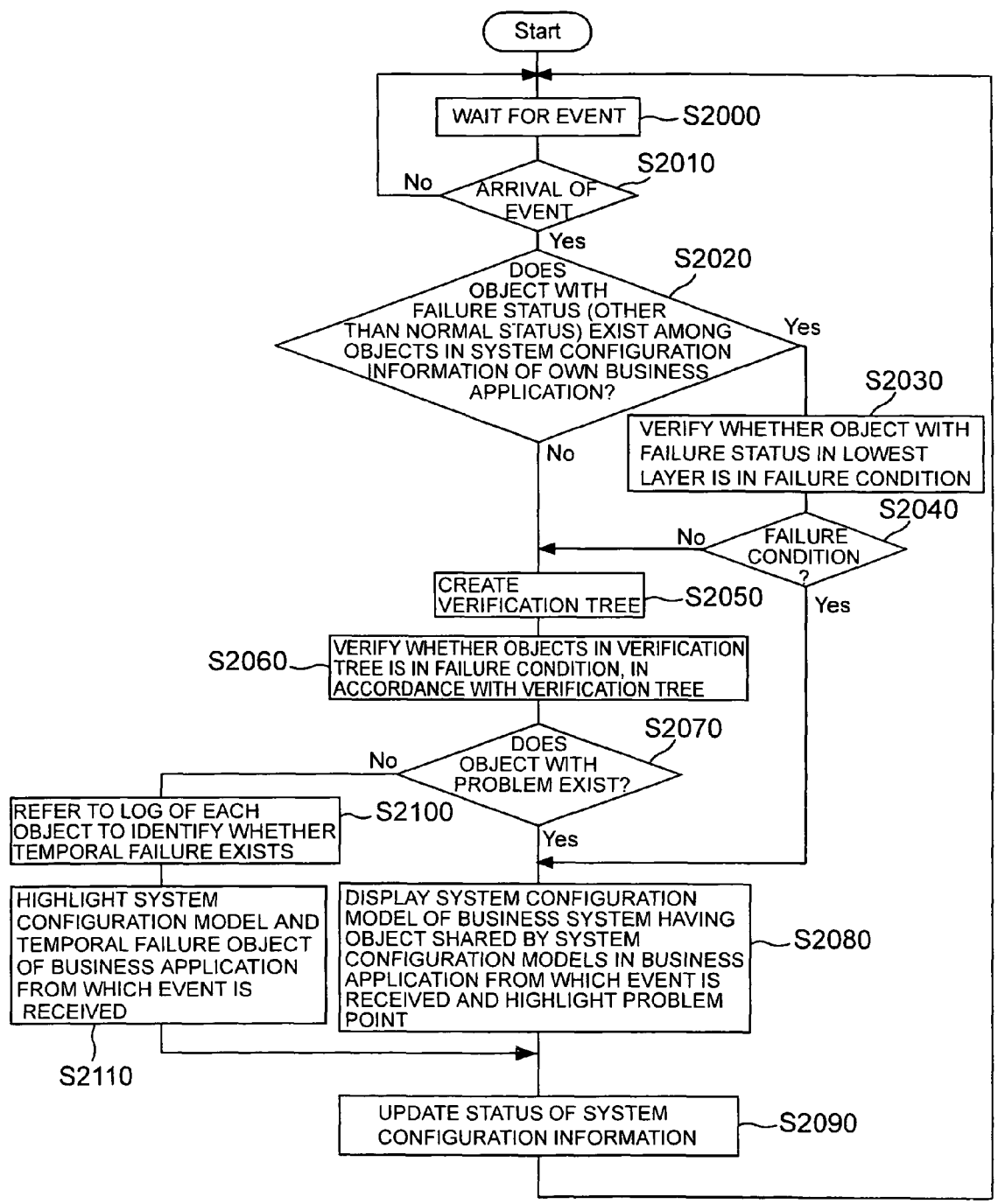
FIG. 16 is a flowchart showing a process flow for narrowing down a failure object.

Then, description is made for the control for narrowing down a failure point in the case that a failure or an abnormality occurs in any component of the data-processing system according to the embodiment. A flowchart is shown in FIG. 16.

First, if a failure or an abnormality occurs in any component of the data-processing system, a problem of some sort is generated in execution of each business application using the component as the data transfer path. Therefore, the abnormality of the business application is detected by the agent program 960 running on the application server 300 executing the application, and the information is sent to the management computer 200 (S2000, S2010). Also, in some cases, a failure or an abnormality occurring in one component has an impact on other components, and problems are generated in the execution of the business applications using other components. In this case, an abnormality of the business application is also detected by the agent program 960 running on the application server 300 executing the application, and the information is sent to the management computer 200 (S2000, S2010). The failure or abnormality is also detected by the agent program 960 running on each component, and the information is sent to the management computer (S2000, S2010).

Processing in S2020 to S2040 is described later.

<Creating Verification Tree>

When receiving information indicating an event (e.g., occurrence of a failure) from the application server 300 executing the agent program 960 which monitors the business application, the management computer 200 refers to the system configuration management table 800 and the object management table 810 showing each component of the data-processing system correlated with the business application to create a verification tree which shows an order of verification for narrowing down the failure point (S2050). Since a plurality of business applications are operated and share resources (components), an object (resource) shared by a plurality of business applications is preferentially verified by referring to the object management table 810. If the verified object has no problem (an abnormality is not detected), an object associated with the object is verified.

Figure 15:
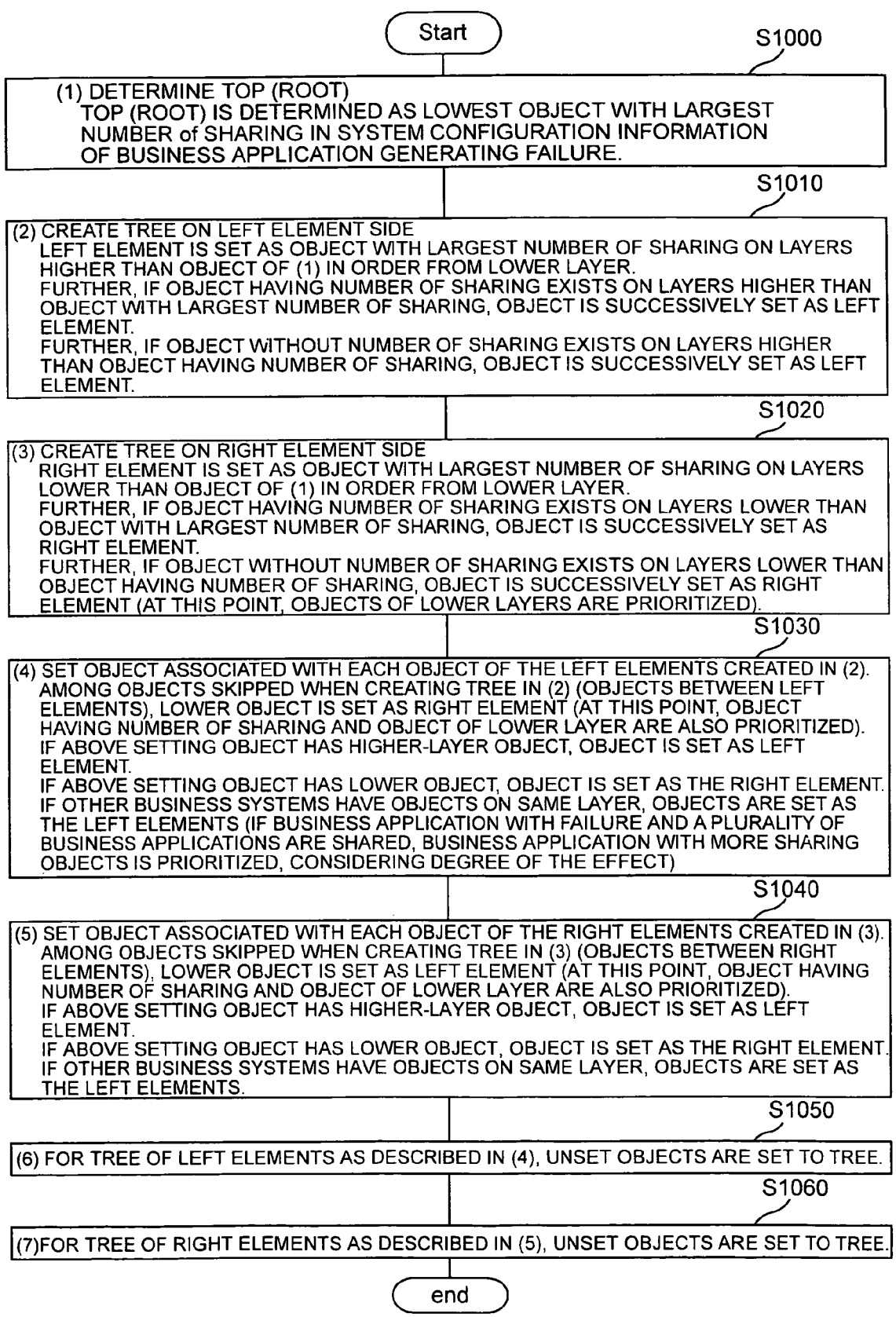
FIG. 15 is a flowchart showing a process flow for generating the search tree.

Procedures for creating the verification tree are described as follows in accordance with a flowchart shown in FIG. 15. Objects of the OS may not be included in the target of the verification.

First, a top (root) of the verification tree is determined (S1000). The top (root) is determined as the lowest object with the largest number of sharing in the system configuration information of the business application generating the failure.

Then, the left-element side of the verification tree is created (S1010). The left element is set as an object with the largest number of sharing on layers higher than the object of S1000 in the order from a lower layer. Further, if an object having the number of sharing exists on layers higher than the object with the largest number of sharing, the object is successively set as the left element. Further, if an object without the number of sharing exists on layers higher than the object having the number of sharing, the object is successively set as the left element.

Then, the right-element side of the verification tree is created (S1020). The right element is set as an object with the largest number of sharing on layers lower than the object of S1000 in the order from a lower layer. Further, if an object having the number of sharing exists on layers lower than the object with the largest number of sharing, the object is successively set as the right element. Further, if an object without the number of sharing exists on layers lower than the object having the number of sharing, the object is successively set as the right element (at this point, objects of lower layers are prioritized).

Then, setting is performed for an object associated with each object of the left elements created in S1010 (S1030). Among the objects skipped when creating the tree in S1010 (objects between the left elements), a lower object is set as the right element. At this point, an object having the number of sharing and an object of a lower layer are prioritized. If the above setting object has a higher-layer object, the object is set as the left element. If the above setting object has a lower object, the object is set as the right element. If other business systems have objects on the same layer, the objects are set as the left elements. If the business application with the failure and a plurality of business applications are shared, the business application with more sharing objects is prioritized, considering the degree of the effect. Taking FIG. 10 as an example, the business application B is handled before the business application C.

Then, setting is performed for an object associated with each object of the right elements created in S1020 (S1040). Among the objects skipped when creating the tree in S1020 (objects between the right elements), a lower object is set as the left element. At this point, an object having the number of sharing and an object of a lower layer are prioritized. If the above setting object has a higher-layer object, the object is set as the left element. If the above setting object has a lower object, the object is set as the right element. If other business systems have objects on the same layer, the objects are set as the left elements.

Then, for the verification tree of the left elements as described in S1030, unset objects are set to the verification tree (S1050).

Then, for the verification tree of the right elements as described in S1040, unset objects are set to the verification tree (S1060).

Figure 14:
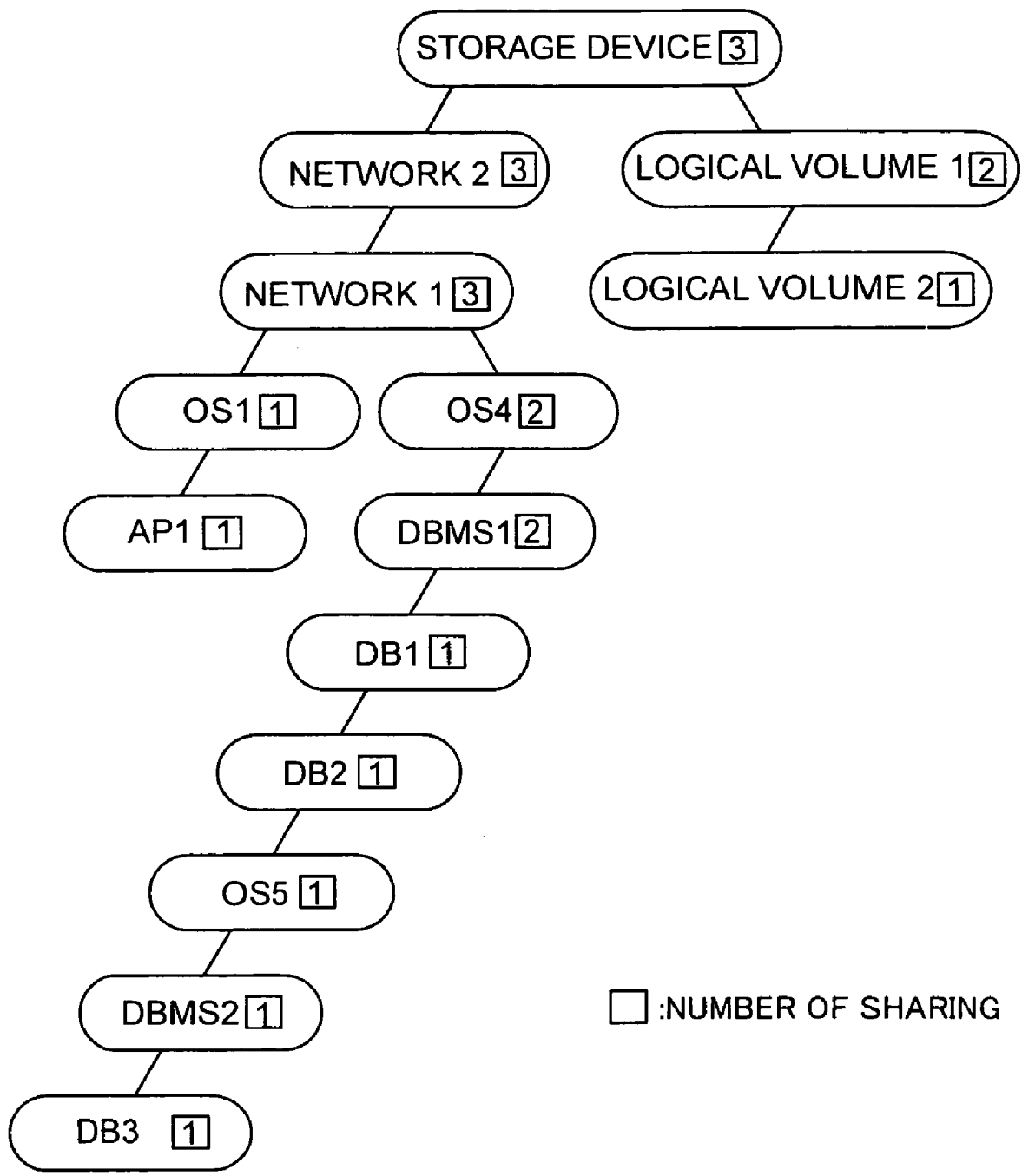
FIG. 14 is a diagram showing a search tree.

In accordance with the above procedures, based on the system configuration information of FIG. 10, an example of creating a verification tree is shown for the case that the agent of the business application A detects a high-load event. FIG. 14 shows the created verification tree.

First, system configuration information is obtained from the "business application A" from which the event was received and business applications which have a shared resource. In FIG. 10, since the "business application B" and the "business application C" have shared resources, the system configuration information is obtained from each of the business applications. Also, the shared objects are obtained and, from the "storage device", the "network 2" and the "network 1" which have the high number of sharing, the "storage device" is set as the top of the verification tree, which is the lowest layer.

Then, the verification tree of the left elements is created. The "network 2" and the "network 1" are respectively set as the left elements of the "storage device". Since the "AP 1" is not shared and exists on a higher layer of the "network 1", the "AP 1" is successively added to the left elements.

Then, the verification tree of the right elements is created. From the "logical volume 1" and the "logical volume 2" which are lower layers of the "storage device", the "logical volume 2" having the higher number of sharing is set as the right element.

Although the "storage device" exists on the lower layer of the "network 2", the right elements are not added since the "storage device" is already set in the verification tree. Since the "DBMS 1" is a shared object on the lower layer of the "network 1", the "DBMS 1" is set as a right element, and left elements are set as the "DB 1" and "DB 2" which is the higher element of the "DBMS" and the "DBMS 1" which is the same layer of the "DBMS 1". Since the "DB 3" is the higher layer of the "DBMS 2", the "DB 3" is set as a left element of the "DBMS 2".

Then, the right elements of the verification tree are updated. Although objects associated with the "logical volume 1" do not exist, since the "logical volume 2" exists in another business system, the "logical volume 2" is added to the left elements.

The verification tree created by above procedures is shown in FIG. 14. The verification tree is recorded as the search tree management table 820 shown in FIG. 13 on the management computer 200.

<Execution of Verification>

Then, the failure point is narrowed down with the use of the verification tree created above (S2060, S2070).

First, target objects of the verification are checked from the top of the verification tree. The check is performed by confirming the status with the monitoring agent of the object.

If an abnormality is detected on the object, the procedure proceeds to the right element and the object of that element is checked. If the procedure can not proceed to the right element, the object is decided as the point generating the failure. If the result of the check can not be identified and the system is in the failure status, then the object is decided as the cause. The result of the determination is stored in the memory 220.

If an abnormality is not detected in the object, the procedure proceeds to the left element and the object of that element is checked. If an abnormality is not detected, the left elements are checked sequentially. If the left element does no longer exist and if processing for branching to the right elements is performed, the point generating the failure is decided as the object which performed the branching to the right elements. If the branching to the right elements was never performed, it means that an object with the detected abnormality does not exist. In this case, it is considered that a temporal failure was generated, and the object generating the abnormality is verified from the past log information (the information sent from each agent program 960 of each component) and the like.

Details of the each object check performed in the above verification processing can be varied depending on the content of the information sent from the application server 300. For example, if a high load is indicated in the content of the information indicating a failure sent from the application server 300 to the management computer 200, the object check can be performed by checking whether a response time exceeds a threshold of the response time set to the target object of the verification. Also, for example, occurrence of a failure (e.g., write error) is indicated in the content of the information indicating a failure sent from the application server 300 to the management computer 200, the object check can be performed by checking whether the target object of the verification is in the failure status (not-operated or resource-deficiency states) and has traces of I/O (Input/Output). In this case, if the object is not in the failure status and does not have the traces of I/O, objects of the left elements are processed. If the object is not in the failure status and has the traces of I/O, objects of the right elements are processed. If the object is in the failure status, that object is decided as the object generating the abnormality.

<Display of Verification Result>

Based on the result of the above verification stored in the memory 220, the management computer 200 displays the object causing the failure or the abnormality on the output device 260 such as a display (S2080, S2110). At this point, the object causing the failure or the abnormality and objects associated with that object are highlighted. The highlighting includes displaying the objects in a color different from other objects and blinking the objects. In the objects are displayed in a color different from other objects, for example, other objects are displayed in black and the object is displayed in red when the status of the object is the "failure" and in yellow when the status is the "alert" or "temporal failure".

Figure 17:
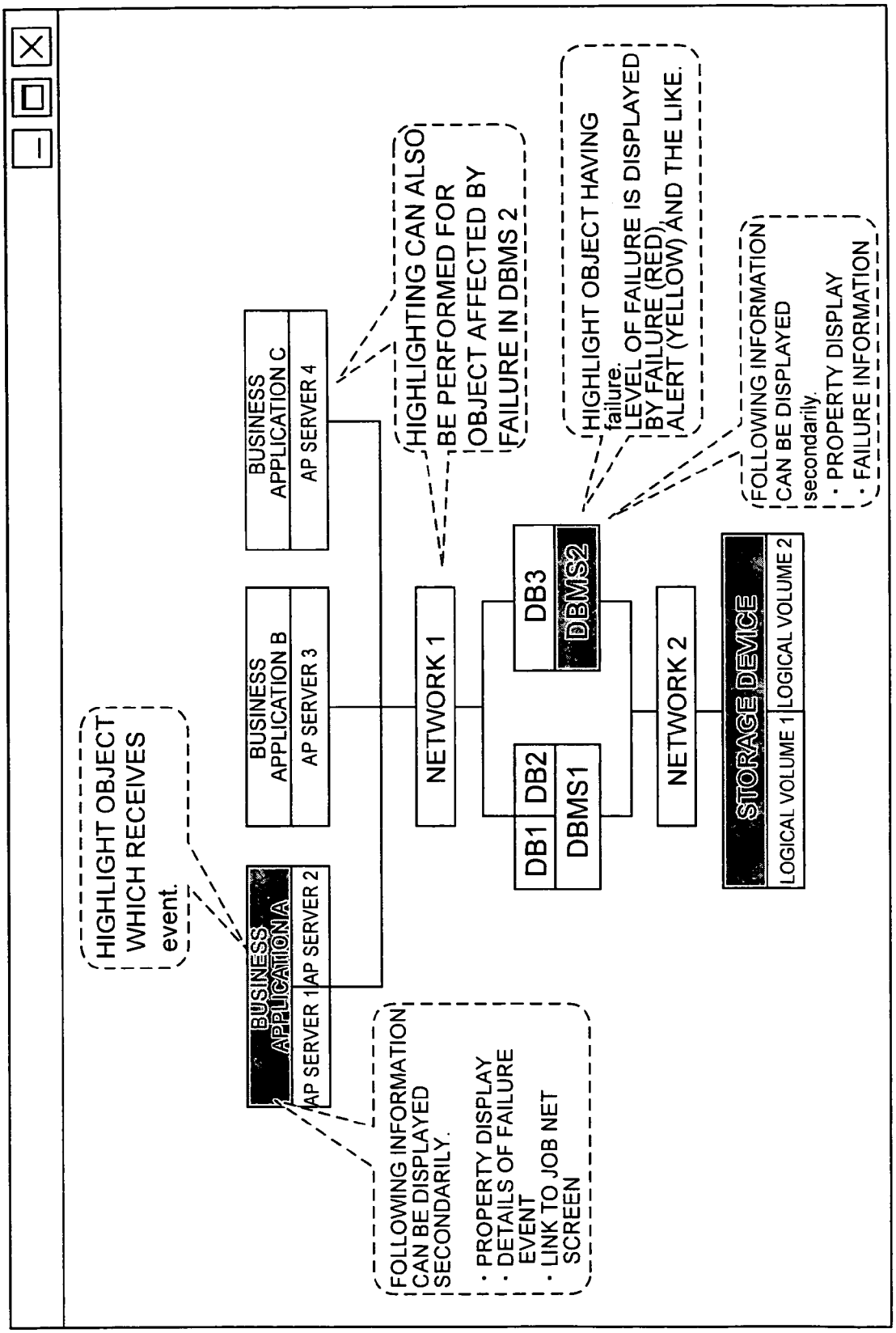
FIG. 17 shows a display example in the case of displaying the failure object.

FIG. 17 shows how the output device 260 such as a display displays the object causing the failure or the abnormality identified by the above verification. Although, in FIG. 17, only the business applications associated with the "business application A" are shown, all the operated business applications can be displayed, and the failure point can be displayed during the display of all the applications.

Based on the result of the above verification stored in the memory 220, the management computer 200 can pass the causal object to the autonomous policy control unit to perform autonomous control in accordance with the autonomous policy. This is achieved by performing the S2080 portion as the autonomous control process.

<Recording of Status>

If the object generating the failure is identified and the failure condition is confirmed in accordance with the above processing, the status of the failure condition is recorded on the system configuration management table 800.

<Processing at the Succeeding Failure>

When a succeeding failure event is generated, the above identified object is preferentially verified (S2020, S2030). If the object is in a failure condition, the object is decided as the point generating the failure without performing the above verification processing and if the object is not in a failure condition, the above verification processing is performed (S2040).

SPECIFIC EXAMPLES

Then, procedures for identifying a failure point is shown for the case that a failure occurs in an object shown below and that the failure is detected in the "business application A", under the condition of the system configuration information shown in FIG. 10.

Example 1

First, descriptions are made for the case that the cause of the failure is a component assigned to other business applications. Specifically, descriptions are made for the case that the "DBMS 2" of the "business application C" is in a high-load condition. The verification tree of FIG. 14 is used.

First, verification is performed for a threshold condition of the "storage device" which is the top of the verification tree. Since the load is not applied to the "storage device", the "network 2" in the left elements is verified. Then, a threshold condition of the "network 2" is verified. Since the load also is not applied to the "network 2", the "network 1" in the left elements is verified.

When a threshold condition of the "network 1" is verified, since the load is applied to the "network 1" due to the effect of the "DBMS 2", the "OS 2" in the right element is verified.

When a threshold condition of the "OS 4" is verified, since the load is not applied to the "OS 4", the "DBMS 1" in the left elements is verified. When a threshold condition of the "DBMS 1" is verified, since the load also is not applied to the "DBMS 1", the "DB 1" in the left elements is verified. When a threshold condition of the "DB 1" is verified, since the load also is not applied to the "DB 1", the "DB 2" in the left elements is verified. When a threshold condition of the "DB 2" is verified, since the load also is not applied to the "DB 2", the "OS 5" in the left elements is verified. When a threshold condition of the "OS 5" is verified, since the load also is not applied to the "OS 5", the "DBMS 2" in the left elements is verified.

A threshold condition of the "DBMS 2" is verified. Since the "DBMS 2" is the original cause, the load is applied to the "DBMS 2". However, since this object has no right element, this object is decided as the cause.

Example 2

Description is made for the case that the "OS 4" of the "business application A" has a failure. Again, the verification tree of FIG. 14 is used.

First, verification is performed for a failure condition and an I/O history of the "storage device". Since the "storage device" is not in a failure condition and has no I/O history, the "network 2" in the left elements is verified.

Verification is performed for a failure condition and an I/O history of the "network 2". Since the "network 2" also is not in a failure condition and has no I/O history, the "network 1" in the left elements is verified.

Verification is performed for a failure condition and an I/O history of the "network 1". Since the "network 1" is not in a failure condition and has an I/O history to the "DB 1", the "OS 4" in the left elements is verified.

Verification is performed for a failure condition and an I/O history of the "OS 4". Since the "OS 4" is in a failure condition, this object is decided as the cause.

Case that Verification Tree is not Created

Figure 18:
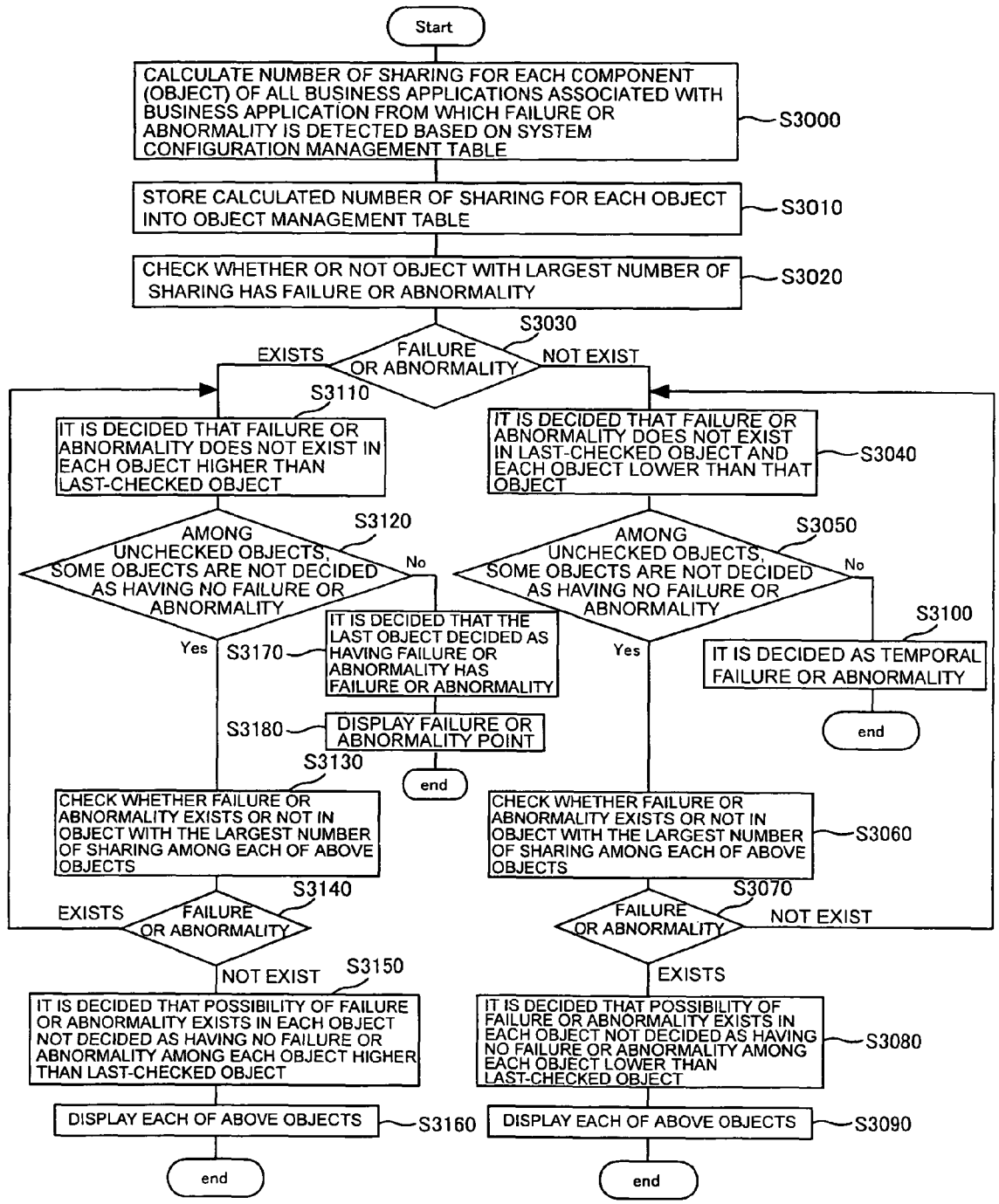
FIG. 18 is a flowchart showing a process flow for narrowing down the failure object.

Although, in the narrowing down processing for the above failure point, the verification is performed after creating the verification tree, the verification can be performed without creating the verification tree. The flow of the processing in this case is described with the use of the flowchart shown in FIG. 18.

First, the management computer 200 refers to the system configuration management table 800 to calculate the number of sharing for objects of all business applications associated with the business application from which a failure or an abnormality is detected (S3000). The number of sharing is the number of the application programs correlated with each component.

The number of sharing for each object is stored in the object management table 810 (S3010).

Then, the management computer 200 selects an object with the largest number of sharing as a target of inspection and checks whether or not the object has a failure or an abnormality (S3020). The check is performed by executing the agent program 960 in the object. The management computer 200 checks whether or not the object has a failure or an abnormality, from the check result sent from the object.

If a plurality of objects have the largest number of sharing, the inspection target can be selected from the objects as an object constituting the data transfer path with the least number of objects respectively aligned on each data transfer path between the each object and each storage device 600, i.e., as the lower object. If a failure or an abnormality occurs in the lower object, the effect of the failure or the abnormality will spread to a wider range than the case of a failure or an abnormality occurring in the higher object. For example, if a failure occurs in the storage device 600, this has an effect on all the business applications using data stored in the storage device. In this way, by selecting the lower object as the target of verification first, whether a failure exists or not can be checked from the object which has a greater effect when a failure occurs.

On the other hand, if a plurality of objects have the largest number of sharing, the inspection target can also be selected from the objects as an object constituting the data transfer path with the least number of objects respectively aligned on each data transfer path between the each object and each application server 300, i.e., as the higher object. If some failure occurs in own operation, an operation manager or operation director of a company wants to know whether the failure is caused by him/her or not. This is because if the failure is caused by him/her, the investigation of the cause must be quickly initiated to take countermeasures, and if the failure is not caused by him/her, investigation of the cause and countermeasures can be left to other managers. If a problem exists in the higher object such as the application program or the application server 300 constituting the information system, countermeasures must be taken by a manager of that operation. In this way, by selecting the higher object as the inspection target first, discrimination can be quickly made for whether the operation manager is responsible for the failure or not.

Also, if a plurality of objects have the largest number of sharing, a switch-over can be performed between selecting the higher object first as the inspection target and selecting the lower object first as the inspection target. This can be achieved by receiving from the input device 250 the input of the selection algorithm selecting information indicating whether the inspection target is selected by an algorithm selecting the inspection target among the plurality of objects with the largest number of sharing as an object constituting the data transfer path with the least number of objects respectively aligned on each data transfer path between each object and each storage device 600, or the inspection target is selected by an algorithm selecting the inspection target among the each object as an object constituting the data transfer path with the least number of objects respectively aligned on each data transfer path between each object and each application server 3001 and by switching the algorithm selecting the inspection target depending on the selection algorithm selecting information. By doing this, flexible response can be made to various concepts of the company for the identification of the failure site at the time of occurrence of a failure.

Further, if a plurality of objects have the largest number of sharing, the inspection target can also be selected from these objects as an object correlated with the application program from which the abnormality is detected. This is because it is believed that the causal object generating the abnormality of the execution of the application program often exists with in the objects used by the application program as the data transfer path. By doing this, the failure site can be quickly identified.

As the result of the check for the object selected in this way, if a failure or an abnormality is not detected (S3030), it is decided that a failure or an abnormality does not exist in the last-checked object and objects lower than the object (S3040). Specifically, the memory 320 respectively stores information indicating that an abnormality does not exist in each component aligned on the data transfer path communicatively connecting the last-checked object (the target component of the inspection) and each storage device 600, the last-checked object, and the storage device 600 communicatively connected to the last-checked object via the data transfer path.

Then, among unchecked objects, if some objects are not yet decided as having no failure or abnormality (S3050), the next inspection target is selected from these objects as an object with the largest number of sharing, and it is checked whether a failure or an abnormality exists or not (S3060). The objects among the unchecked objects not yet decided as having no failure or abnormality are objects for which information indicating no abnormality is not yet recorded, among the objects aligned on the data transfer path communicatively connecting the last-checked object (the target component of the inspection) and each application server 300. In S3050, if all the objects are decided as having no failure or abnormality, it is decided that a transient failure or abnormality occurred (S3100).

As a result of the check in S3060, if an abnormality is detected in that object (S3070), it is decided that the cause of the failure or the abnormality is any one of the objects not yet decided as having no failure or abnormality among objects lower than that object (S3080). In this way, the object causing the failure can be narrowed down to objects other than the objects already decided as having no failure or abnormality, among the objects lower than the above object from which the abnormality is detected. Each narrowed-down object, i.e., the result of the inspection is displayed on the output device 260 such as a display of the management computer 200 (S3090).

On the other hand, if a failure or an abnormality is not detected in S3070, the processing from S3040 is repeated. Therefore, the inspection target can be narrowed down to the higher object until the failure or the abnormality is detected. In this way, in the embodiment, the object causing the failure or abnormality can be narrowed down highly efficiently.

On the other hand, as a result of checking the object in S3020, if a failure or an abnormality is detected (S3030), it is decided that a failure or an abnormality does not exist in objects higher than the last checked object (S3110). Specifically, the memory 320 respectively stores information indicating that an abnormality does not exist in each component aligned on the data transfer path communicatively connecting the last-checked object (the target component of the inspection) and each application server 300, and the application server 300 communicatively connected to the last-checked object via the data transfer path.

Then, among unchecked objects, if some objects are not yet decided as having no failure or abnormality (S3120), the next inspection target is selected from these objects as an object with the largest number of sharing, and it is checked whether a failure or an abnormality exists or not (S3130). The objects among the unchecked objects not yet decided as having no failure or abnormality are objects for which information indicating no abnormality is not yet recorded, among the objects aligned on the data transfer path communicatively connecting the last-checked object (the target component of the inspection) and each storage device 600. In S3120, if all the objects are decided as having no failure or abnormality, it is decided that the cause of the failure or the abnormality is the last object decided as having a failure or an abnormality (S3170). That object, i.e., the result of the inspection is displayed on the output device 260 such as a display of the management computer 200 (S3180).

As a result of the check in S3130, if an abnormality is not detected in that object (S3140), it is decided that the cause of the failure or the abnormality is any one of the objects not decided as having no failure or abnormality among objects higher than that object (S3150). In this way, the object causing the failure can be narrowed down to objects other than the objects already decided as having no failure or abnormality, among the objects higher than the above object from which the abnormality is not detected. Each narrowed-down object, i.e., the result of the inspection is displayed on the output device 260 such as a display of the management computer 200 (S3160).

On the other hand, if a failure or an abnormality is detected in S3140, the processing from S3110 is repeated. Therefore, the inspection target can be narrowed down to the lower object until the failure or the abnormality is detected. In this way, in the embodiment, the object causing the failure or abnormality can be narrowed down highly efficiently.

Figure 19:
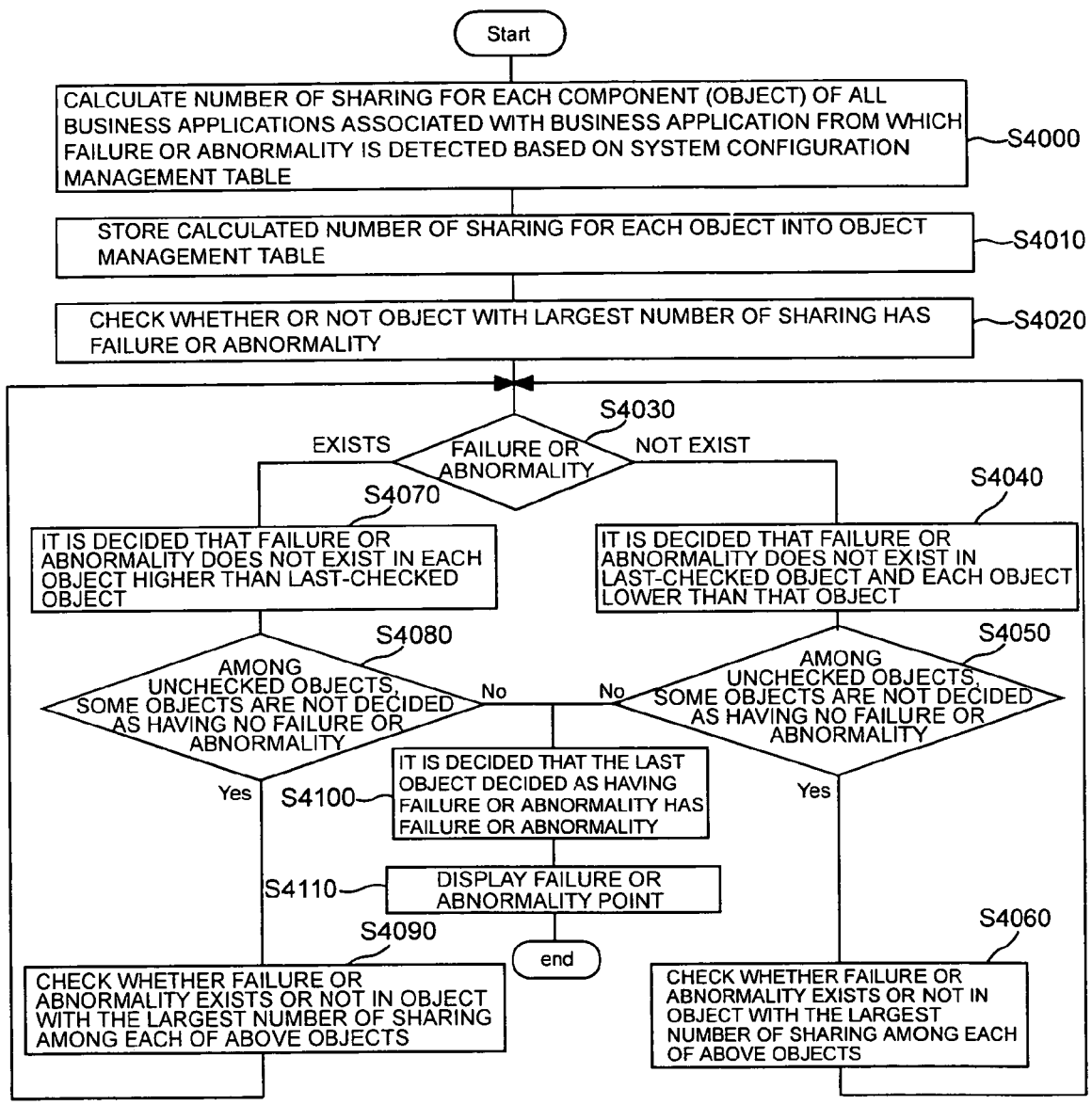
FIG. 19 is a flowchart showing a process flow for narrowing down the failure object.

Also, in the case of performing verification without creating the verification tree, the processing can be performed as follows. The process flow in this case is described with the use of a flowchart shown in FIG. 19.

First, the management computer 200 refers to the system configuration management table 800 to calculate the number of sharing for objects of all business applications associated with the business application from which a failure or an abnormality is detected (S4000).

The number of sharing for each object is stored in the object management table 810 (S4010).

Then, the management computer 200 selects an object with the largest number of sharing as a target of inspection and checks whether or not the object has a failure or an abnormality (S4020). The check is performed by executing the agent program 960 in the object. The management computer 200 checks whether or not the object has a failure or an abnormality, from the check result sent from the object.

Again, if a plurality of objects have the largest number of sharing, the inspection target can be selected from the objects as an object constituting the data transfer path with the least number of objects respectively aligned on each data transfer path between the each object and each storage device 600, i.e., as the lower object. By selecting the lower object as the target of verification first, whether a failure exists or not can be checked from the object which has a greater effect when a failure occurs.

Similarly, if a plurality of objects have the largest number of sharing, the inspection target can also be selected from the objects as an object constituting the data transfer path with the least number of objects respectively aligned on each data transfer path between the each object and each application server 300, i.e., as the higher object. By selecting the higher object as the inspection target first, discrimination can be quickly made for whether the operation manager is responsible for the failure or not.

Also, if a plurality of objects have the largest number of sharing, a switch-over can be performed between selecting the higher object first as the inspection target and selecting the lower object first as the inspection target. By doing this, flexible response can be made to various concepts of the company for the identification of the failure site at the time of occurrence of a failure.

As the result of the check for the object selected in this way, if a failure or an abnormality is not detected (S4030), it is decided that a failure or an abnormality does not exist in the last-checked object and objects lower than the object (S4040). Specifically, the memory 320 respectively stores information indicating that an abnormality does not exist in each component aligned on the data transfer path communicatively connecting the last-checked object (the target component of the inspection) and each storage device 600, the last-checked object, and the storage device 600 communicatively connected to the last-checked object via the data transfer path.

Then, among unchecked objects, if some objects are not yet decided as having no failure or abnormality (S4050), the next inspection target is selected from these objects as an object with the largest number of sharing, and it is checked whether a failure or an abnormality exists or not (S4060). The objects among the unchecked objects not yet decided as having no failure or abnormality are objects for which information indicating no abnormality is not yet recorded, among the objects aligned on the data transfer path communicatively connecting the last-checked object (the target component of the inspection) and each application server 300. In S4050, if all the objects are decided as having no failure or abnormality, it is decided that the cause of the failure or the abnormality is the last object decided as having a failure or an abnormality (S4100). That object, i.e., the result of the inspection is displayed on the output device 260 such as a display of the management computer 200 (S4110).

As a result of the check in S4060, if an abnormality is not detected in that object, the processing from S4040 is repeated. Therefore, the inspection target can be narrowed down to the higher object until the failure or the abnormality is detected. In this way, in the embodiment, the object causing the failure or abnormality can be narrowed down highly efficiently.

On the other hand, as a result of checking the object in S4060, if a failure is detected in that object (S4030), it is decided that a failure or an abnormality does not exist in objects higher than the last checked object (S4070). Specifically, the memory 320 respectively stores information indicating that an abnormality does not exist in each component aligned on the data transfer path communicatively connecting the last-checked object (the target component of the inspection) and each application server 300, and the application server 300 communicatively connected to the last-checked object via the data transfer path.

Then, among unchecked objects, if some objects are not yet decided as having no failure or abnormality (S4080), the next inspection target is selected from these objects as an object with the largest number of sharing, and it is checked whether a failure or an abnormality exists or not (S4090). The objects among the unchecked objects not yet decided as having no failure or abnormality are objects for which information indicating no abnormality is not yet recorded, among the objects aligned on the data transfer path communicatively connecting the last-checked object (the target component of the inspection) and each storage device 600. In S4080, if all the objects are decided as having no failure or abnormality, it is decided that the cause of the failure or the abnormality is the last object decided as having a failure or an abnormality (S4100). That object, i.e., the result of the inspection is displayed on the output device 260 such as a display of the management computer 200 (S4110).

As a result of the check in S4090, if a failure or an abnormality is detected in that object, the processing from S4070 is repeated. As a result of the check in S4090, if a failure or an abnormality is not detected in that object, the processing from S4040 is repeated. By doing this, the inspection target can be narrowed down until the failure or the abnormality is detected. In this way, in the embodiment, the object causing the failure or abnormality can also be narrowed down highly efficiently.

Also, the management computer 200 can pass the object, which can be identified as causing the failure or the abnormality as above, to the autonomous policy control unit to perform autonomous control in accordance with the autonomous policy.

Identification of More Detail Failure Site in Object

If the object generating the failure or the abnormality could be identified with above processing, a failure site can also be identified in that object in more detail.

Hereinafter, in the embodiment, descriptions are made for the case of identifying a failure site in more detail, if the storage device 600 could be identified as an object generating a failure or an abnormality among the components of the data-processing system. Of course, this is the same as the case that other components can be identified as an object generating a failure or an abnormality.

Figure 20:
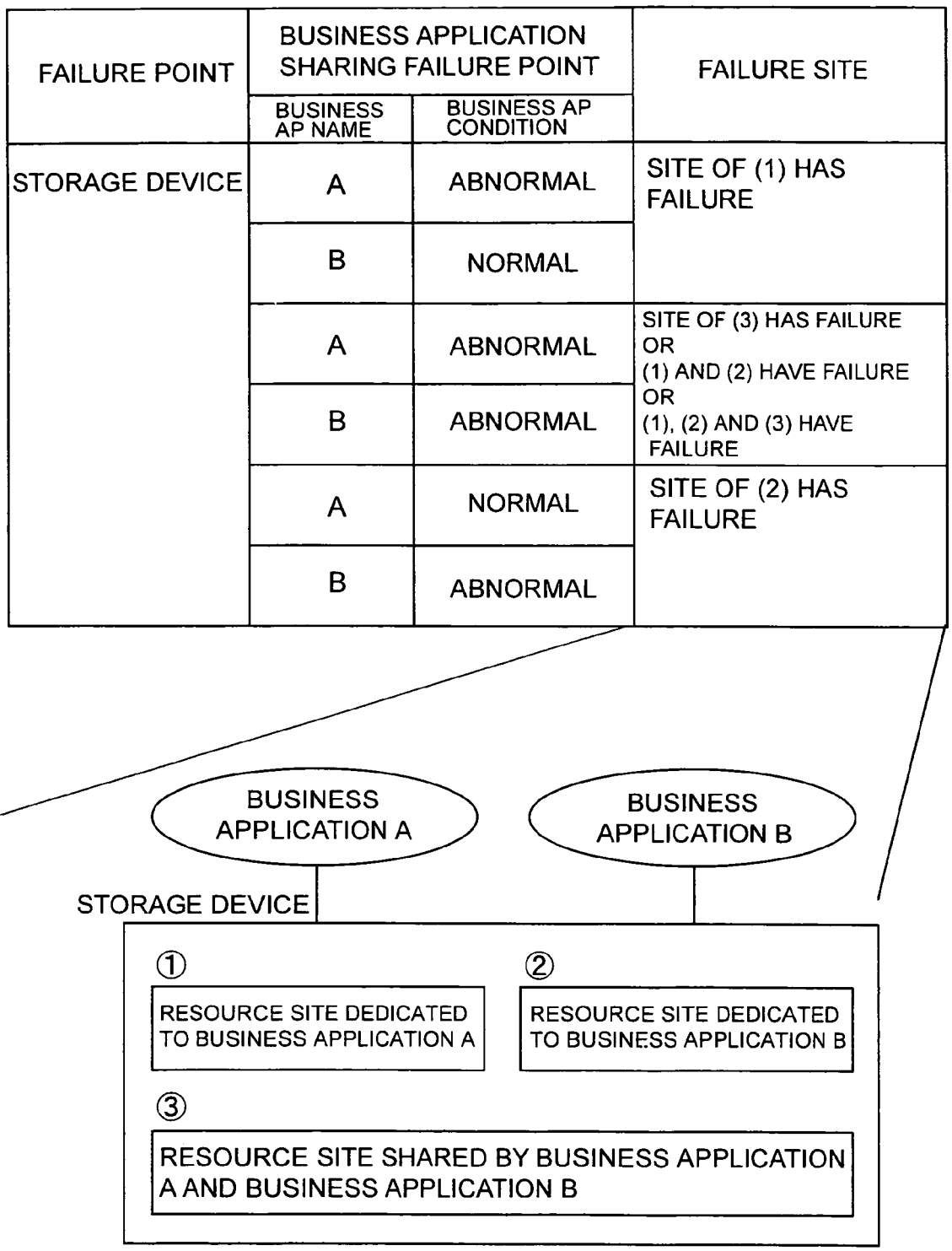
FIG. 20 is a diagram describing processing in the case of searching a failure site in more detail in the failure object.

As shown in FIG. 20, the storage device 600 is a component of the data-processing system shared by the business application A and the business application B. The component of the storage device 600, for example, the logical volume can be categorized to a portion dedicated to the business application A, a portion dedicated to the business application B and a portion shared by the business application A and the business application B.

Therefore, if the management computer 200 receives information which indicates a failure in the business application from the application server 300, a failure site of a component within the storage device 600 can be identified in more detail depending on whether the information indicates a failure of the business application A only, a failure of the business application B only or failures of both the business application A and the business application B.

Specifically, as shown in FIG. 20, if the information indicating a failure of the business application only indicates a failure of the business application A, it can be identified that the failure occurs in the component dedicated to the business application A. Also, if the information indicating a failure of the business application only indicates a failure of the business application B, it can be identified that the failure occurs in the component dedicated to the business application B. Further, if the information indicating a failure of the business application indicates failures of both the business application A and the business application B, it can identified that a failure occurs in the component shared by the business application A and the business application B, that failures occur in both the component dedicated to the business application A and the component dedicated to the business application B or that failures occur in all the components which are the component shared by the business application A and the business application B, the component dedicated to the business application A and the component dedicated to the business application B.

In this way, in the embodiment, for each application program using an object identified as a failure site as a data transfer path, a site causing an abnormality in the object can be identified in more detail depending on combinations of existence and nonexistence of reception of the abnormality detection information sent from the application server 300.

<Process Flow>

Figure 21:
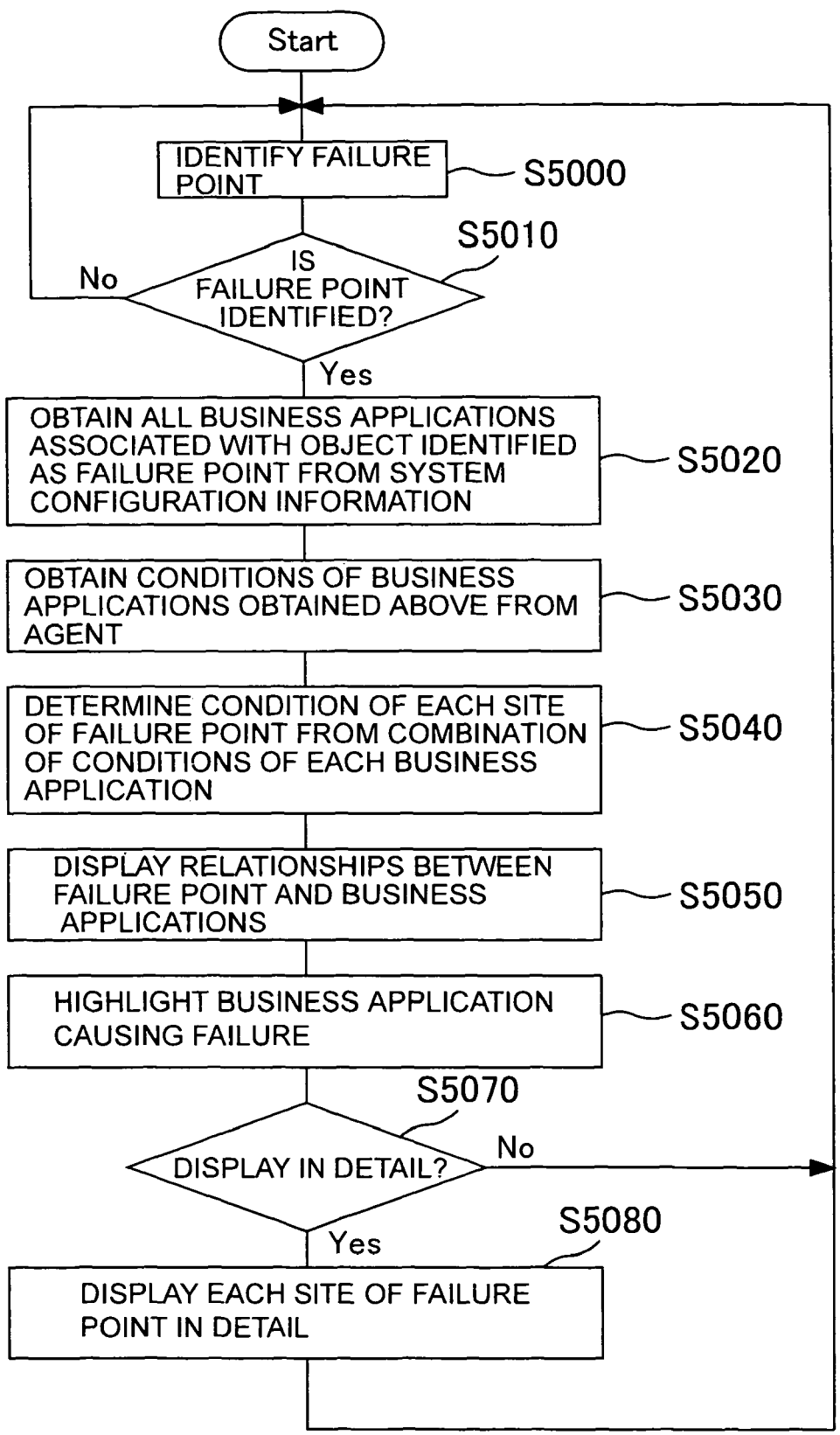
FIG. 21 is a flowchart showing a process flow in the case of searching the failure site in more detail in the failure object.

The flow of the above processing is described with reference to a flowchart shown in FIG. 21.

First, the management computer 200 identifies a failure point (S5000). This can be done by executing the processing shown in FIG. 16, for example. Once the failure point is identified (S5010), the management computer 200 obtains all the business applications using the object identified as the failure site as a data transfer path, from the system configuration information (S5020). Then, the conditions of the business applications obtained in S5020 are obtained from the agent (S5030). In other words, for each application program using the object identified as the failure site as a data transfer path, the management computer 200 checks existence or nonexistence of reception of the abnormality detection information sent from the application server 300. Then, the condition of each site of the failure point is determined from the combination of the conditions of each business application (S5040). Once the condition of each site of the failure point is determined, the relationships between the failure point and the business applications are displayed (S5050), and the business application causing the failure is highlighted on the output device 260 (S5060). If detailed display is instructed by an operator (S5070), each site of the failure point is displayed in detail (S5080).

Figure 22:
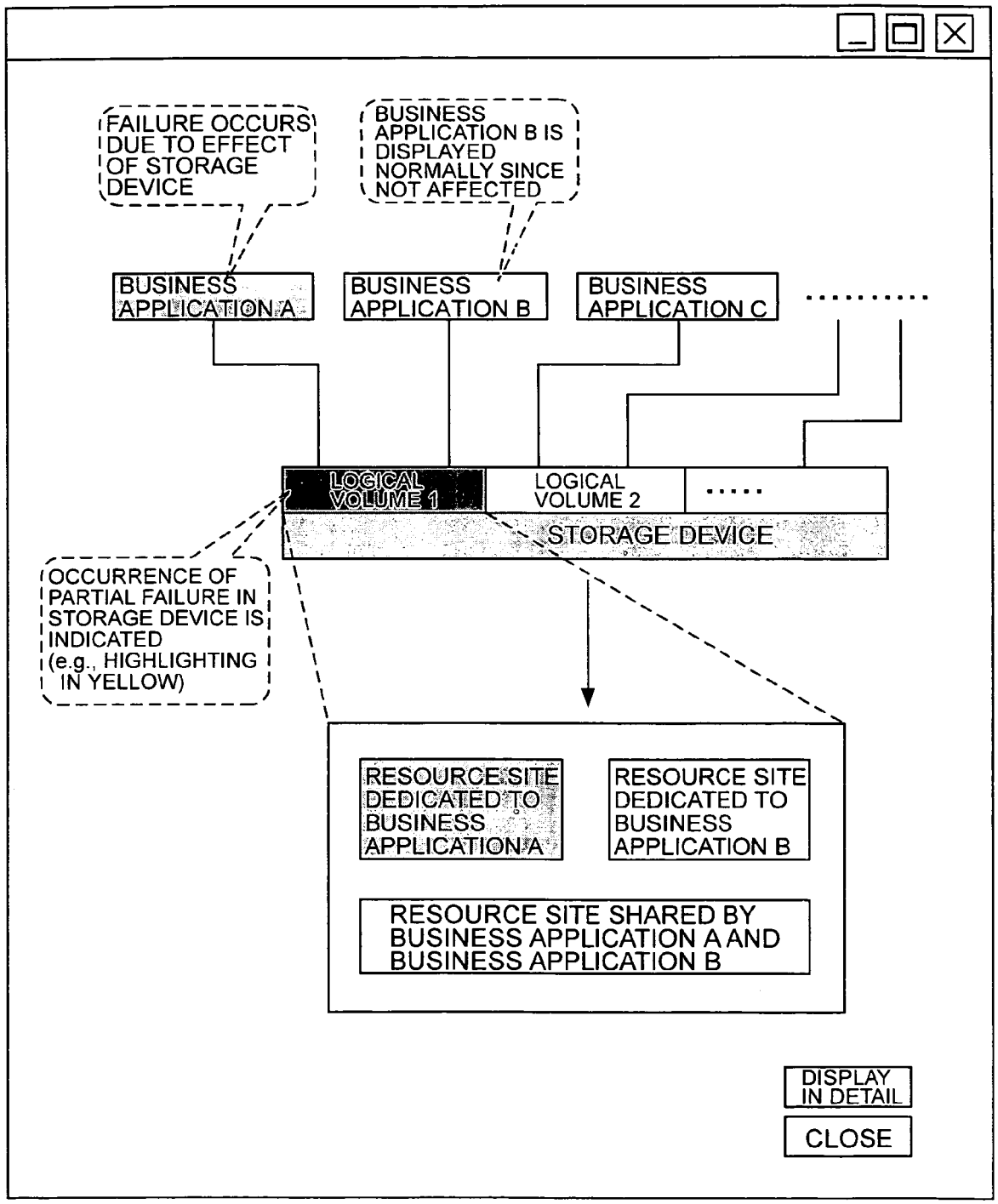
FIG. 22 shows a display example in the case of displaying the failure site in more detail in the failure object.

FIG. 22 shows how this information is displayed on the output device 260 such as a display of the management computer 200. FIG. 22 shows an example in the case that a failure occurs in a site dedicated to the business application A among the components of the storage device 600.

Also, the management computer 200 can pass the object, which can be identified as causing the failure or the abnormality in detail as above, to the autonomous policy control unit to perform autonomous control in accordance with the autonomous policy.

In this way, in the embodiment, a system administrator can be notified of a failure site in more detail. Therefore, accurate response can be made if a failure occurs in the data-processing system. Also, if a full-time administrator exists for each component constituting the data-processing system, a display function for the full-time administrator can be provided.

According to the embodiments described above, if a failure occurs in the data-processing system, a component causing the failure can be quickly narrowed down. This can be achieved by checking existence or nonexistence of a failure in the component shared by the more application programs first. This is because the component shared by the more application programs has higher possibility of occurrence of a failure and tends to be affected by a failure generated in other components.

Especially, as is the case for the web 2/3 hierarchical applications, if the business system consists of resources such as a plurality of servers, DBMSs, storage devices and others and if the business system is operated while these resources are shared by a plurality of business applications, it is important to be able to narrow down a failure generating point when a failure condition (a high-load condition or failure) is detected in one business application. This is because if a failure is detected in the business application, the failure may occur in some place of a business system constituting the business application or on a shared business system of other business applications, rather than the cause of failure is the business application (for example, even when a write error is detected in the business application, if a failure occurs in the destination DBMS, the cause of the error is the DBMS rather than the business application).

According to the embodiments, by handling each component (server, DBMS, storage and the like) constituting a business system executing a business application as an object and by maintaining relevant information of the objects as system configuration information, a component truly causing a failure can easily be verified, identified and troubleshot from the system configuration information of the business system operating a plurality of business applications.

Although the best mode for carrying out the present invention has been described hereinabove, the embodiments are intended to facilitate understanding of the present invention and are not to be construed as limiting the present invention. The present invention may be altered or modified without departing from the spirit thereof and the present invention encompasses equivalents thereof.

What is claimed is:

1. A data-processing apparatus communicatively connected to a data-processing system, the data-processing system having at least one computer executing at least one application program and at least one storage device storing data, the at least one computer and the at least one storage device being communicatively connected via a plurality of data transfer paths respectively assigned to a plurality of application programs, each data transfer path comprising a plurality of components, the data-processing apparatus comprising:

a system configuration storage unit storing, in a correlated manner, each component and an application program using one of the plurality of data transfer paths including the correlated component;

an abnormality detection information reception unit receiving abnormality detection information indicating that an abnormality is detected while executing an application program, from the at least one computer;

an inspection target selection unit selecting an inspection target from the plurality of components as part of a sequence of detecting an abnormal target, wherein the component selected as the inspection target is the component that is correlated with the largest number of application programs, the inspection target selection unit further selecting as a next inspection target a different component, wherein if no abnormality is detected in the component selected as the inspection target, the inspection target selection unit selects as a next inspection target a component that is correlated with the largest number of application programs from the plurality of components that are on the same data transfer path between the component selected as the inspection target and the at least one computer, and wherein if an abnormality is detected in the component selected as the inspection target, the inspection target selection unit selects as a next inspection target a component that is correlated with the largest number of application programs from the plurality of components that are on the same data transfer path between the component selected as the inspection target, and the at least one storage device; and an inspection result storage unit storing a result of inspection for the component selected as the inspection target.

2. The data-processing apparatus of claim 1, wherein if more than one of the plurality of components on the plurality of data transfer paths are correlated with the largest number of application programs, the inspection target selection unit selects the inspection target from the more than one of the plurality of components, wherein the selected inspection target is the component on the data transfer path that has the least number of components between the selected, component and the at least one storage device.

3. The data-processing apparatus of claim 1,
wherein if more than one of the plurality of components on the plurality of data transfer paths are correlated with the largest number of application programs, the inspection target selection unit selects the inspection target from the more than one of the plurality of components, wherein the selected inspection target is the component on the data transfer path that has the least number of components between the selected component and the at least one computer.

4. The data-processing apparatus Of claim 1, further comprising:
a selection algorithm input unit which, if more than one of the plurality of components on the plurality of data transfer paths are correlated with the largest number of application programs when selecting the inspection target, receives input of selection algorithm selecting information indicating whether the inspection target is to be selected by an algorithm selecting the inspection target on the data transfer path that has the least number of components between the selected component and the at least one storage device, or whether the inspection target is to be selected by an algorithm selecting the inspection target on the data transfer path that has the least number of components between the selected component and the at least one computer,
wherein the inspection target selection unit switches the algorithm selecting the inspection, target depending on the selection algorithm selecting information.

5. The data-processing apparatus of claim 1, wherein, if no abnormality is detected in the component selected as the inspection target, the inspection target selection unit stores information indicating that an abnormality does not exist in each component on the same data transfer path communicatively connecting the component selected as the inspection target and the at least one storage device, and the inspection target selection unit selects, as a next inspection target, a component, from the plurality of components not selected as the inspection target on the same data transfer path as the component selected as the inspection target, that is correlated with the largest number of application programs and for which information indicating no abnormality is stored, and wherein, if an abnormality is detected in the component selected as the inspection target, the inspection target selection unit stores information indicating that an abnormality does not exist in each component on the same data transfer path communicatively connecting the component selected as the inspection target and the at least one computer, and the inspection target selection unit selects as a next inspection target, a component, from the plurality of components not selected as the inspection target on the same data transfer path as the component selected as the inspection target, that is correlated with the largest number of application programs and for which information indicating no abnormality is stored.

6. The data-processing apparatus of claim 5, wherein, of the plurality of components not selected as an inspection target, if more than one of the plurality of components are correlated with the largest number of application programs and for which information indicating no abnormality is stored, the inspection target selection unit selects as a next inspection target, a component correlated with the application program from which an abnormality is detected.

7. The data-processing apparatus of claim 5, wherein, of the plurality of components not selected as an inspection target, if some more than one of the plurality of components are correlated with the largest number of application programs and for which information indicating no abnormality is stored, the inspection target selection unit selects as a next inspection target, a component on the same data transfer path having the least number of components between the selected component and the at least one storage device.

8. The data-processing apparatus of claim 5, wherein, of the plurality of components not selected as an inspection target, if more than one of the plurality of components are correlated with the largest number of application programs and for which information indicating no abnormality is stored, the inspection target selection unit selects as a next inspection target, a component on the same data transfer path having the least number of components between the selected component and the at least one computer.

9. The data-processing apparatus of claim 1, further comprising:
an inspection result output unit outputting the inspection result to a user interface.

10. The data-processing apparatus of claim 1, further comprising:
an autonomous policy control unit performing autonomous control of the data-processing system depending on the inspection result.

11. The data-processing apparatus of claim 5, further comprising:
an abnormality point identification unit which, if information indicating no abnormality is stored for the components not selected as an inspection target, identities the most recent component from which an abnormality is detected as a component causing the abnormality detected while executing the application.

12. The data-processing apparatus of claim 11,
wherein the inspection target selection unit first selects as an inspection target a component identified in the past as being a component causing the abnormality detected while executing the application program.

13. The data-processing apparatus of claim 11, further comprising:
an abnormality point detail identification unit which identifies a site causing an abnormality in the component depending on combinations of existence and nonexistence of reception of the abnormality detection information for each application program using as the data transfer path the component identified as being a component causing the abnormality detected while executing the application program.

14. The data-processing apparatus of claim 13, further comprising:
an abnormality point output unit outputting the identified site causing the abnormality to a user interface.

15. The data-processing apparatus of claim 13, further comprising:
an autonomous policy control with performing autonomous control of the data-processing system depending, on the identified site causing the abnormality.

16. A method of controlling a data-processing apparatus communicatively connected to a data-processing system, the data-processing system having at least one computer executing at least one application program and at least one storage device storing data, the at least one computer and the at least one storage device being communicatively connected via a plurality of data transfer paths respectively assigned to a plurality of application programs, each data transfer path comprising a plurality of components, the method comprising the steps of:

- storing, in a correlated manner, each component and an application program using one of the plurality of data transfer paths
- receiving abnormality detection information indicating that an abnormality is detected while executing an application program, from the at least one computer;
- selecting an inspection target from the plurality of components as part of a sequence of detecting an abnormal target, wherein the component selected as the inspection target is the component that is correlated with the largest number of application programs;
- selecting as a next inspection target a different component in the same data transfer path as the component initially selected as the inspection target and the at least one storage device, wherein the different component is located between the at least one storage device and the component initially selected as the inspection target on the same data transfer path; and
- storing a result of inspection for the component selected as the inspection target.

17. An executable program code stored on a non-transitory computer-readable medium that, when executed, is operable to drive a data-processing apparatus communicatively connected to a data-processing system, the data-processing system having at least one computer executing at least one application program and at least one storage device storing data, the at least one computer and the at least one storage device being communicatively connected via a plurality of data transfer paths respectively assigned to a plurality of application programs, each data transfer path comprising, a plurality of components, the executable program code comprising to

- code for storing, in a correlated manner, each component and an application program using one of the plurality of data transfer paths;
- code for receiving abnormality detection information indicating that an abnormality is detected while executing an application program, from the at least one computer;
- code for selecting an inspection target from the plurality of components as part of a sequence of detecting an abnormal target, wherein the component selected as the inspection target is the component that is correlated with the largest number of application programs;
- code for selecting, as a next inspection target a different component in the same data transfer path as the component initially selected as the inspection target and the at least one storage device, wherein the different component is located between the at least one storage device and the component initially selected as the inspection target on the same data transfer path; and
- code for storing a result of inspection for the component selected as the inspection target.

\* \* \* \* \*